(12) United States Patent
Glaser et al.

(10) Patent No.: US 11,922,390 B2
(45) Date of Patent: *Mar. 5, 2024

(54) COMMERCE AUTOMATION FOR A FUELING STATION

(71) Applicant: Grabango Co., Berkeley, CA (US)

(72) Inventors: William Glaser, Berkeley, CA (US); Brian Van Osdol, Piedmont, CA (US)

(73) Assignee: Grabango Co, Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/588,125

(22) Filed: Jan. 28, 2022

(65) Prior Publication Data

US 2022/0230157 A1    Jul. 21, 2022

Related U.S. Application Data

(63) Continuation of application No. 16/667,859, filed on Oct. 29, 2019, now Pat. No. 11,288,648.

(Continued)

(51) Int. Cl.
*G06Q 20/20*   (2012.01)
*B60L 53/66*   (2019.01)

(52) U.S. Cl.
CPC ......... *G06Q 20/204* (2013.01); *B60L 53/665* (2019.02); *B60Y 2200/91* (2013.01); *B60Y 2300/91* (2013.01)

(58) Field of Classification Search
CPC .................................................. G06Q 20/204
See application file for complete search history.

(56) References Cited

U.S. PATENT DOCUMENTS

| 5,418,567 A | 5/1995 | Boers et al. |
| 6,996,460 B1 | 2/2006 | Krahnstoever et al. |

(Continued)

FOREIGN PATENT DOCUMENTS

| BR | 102016019151 A2 | 3/2018 |
| DE | 102009049754 A1 * | 4/2011 |

(Continued)

OTHER PUBLICATIONS

"Chevron rolls out first gas pumps with Apple Pay support", 2015, https://appleinsider.com/articles/15/07/14/chevron-rolls-out-first-gas-pumps-with-apple-pay-support (Year: 2015).*

(Continued)

*Primary Examiner* — Allen C Chein
(74) *Attorney, Agent, or Firm* — Alpine Patents LLC; Brian Van Osdol

(57) ABSTRACT

A system and method for vehicle facilitated commerce comprising: collecting a payment mechanism associated with a vehicle station at a vehicle service site; collecting image data in a defined region containing the vehicle station and a defined commerce region; initializing monitoring of at least one detected user associated with the vehicle station; monitoring commerce activity of the user, which comprises of: through CV processing of image data, detecting at least one commerce activity event involving the user and updating a checkout list associated with the user based on the commerce activity event; and executing a transaction with the payment mechanism for the checkout list.

18 Claims, 15 Drawing Sheets

Related U.S. Application Data

(60) Provisional application No. 62/752,222, filed on Oct. 29, 2018.

(56) References Cited

U.S. PATENT DOCUMENTS

| | | |
|---|---|---|
| 7,053,915 B1 | 5/2006 | Jung et al. |
| 7,227,976 B1 | 6/2007 | Jung et al. |
| 7,274,803 B1 | 9/2007 | Sharma et al. |
| 7,319,779 B1 | 1/2008 | Mummareddy et al. |
| 7,505,621 B1 | 3/2009 | Agrawal et al. |
| 7,590,261 B1 | 9/2009 | Mariano et al. |
| 7,711,155 B1 | 5/2010 | Sharma et al. |
| 7,734,070 B1 | 6/2010 | Sharma et al. |
| 7,848,548 B1 | 12/2010 | Moon et al. |
| 7,912,246 B1 | 3/2011 | Moon et al. |
| 7,921,036 B1 | 4/2011 | Sharma et al. |
| 7,987,111 B1 | 7/2011 | Sharma et al. |
| 8,027,521 B1 | 9/2011 | Moon et al. |
| 8,219,438 B1 | 7/2012 | Moon et al. |
| 8,379,937 B1 | 2/2013 | Moon et al. |
| 8,396,758 B2 | 3/2013 | Paradise et al. |
| 8,412,656 B1 | 4/2013 | Baboo et al. |
| 8,448,859 B2 | 5/2013 | Goncalves et al. |
| 8,520,906 B1 | 8/2013 | Moon et al. |
| 8,606,645 B1 | 12/2013 | Applefeld |
| 9,250,712 B1 | 2/2016 | Todeschini |
| 9,262,681 B1 | 2/2016 | Mishra |
| 9,317,785 B1 | 4/2016 | Moon et al. |
| 9,412,099 B1 | 8/2016 | Tyree |
| 9,426,720 B2 | 8/2016 | Cohn et al. |
| 9,474,934 B1 | 10/2016 | Krueger et al. |
| 9,911,290 B1 | 3/2018 | Zalewski et al. |
| 10,062,066 B2 | 8/2018 | Cancro et al. |
| 10,282,720 B1 * | 5/2019 | Buibas .................. G06V 20/52 |
| 10,282,852 B1 | 5/2019 | Buibas et al. |
| 10,339,595 B2 | 7/2019 | Glaser et al. |
| 10,347,009 B1 | 7/2019 | Terven et al. |
| 10,380,814 B1 | 8/2019 | Mathiesen et al. |
| 10,474,858 B2 | 11/2019 | Davis et al. |
| 10,615,994 B2 | 4/2020 | Glaser et al. |
| 10,740,742 B2 | 8/2020 | Glaser et al. |
| 10,832,311 B2 | 11/2020 | Chomley et al. |
| 10,963,704 B2 | 3/2021 | Glaser et al. |
| 11,288,648 B2 | 3/2022 | Glaser et al. |
| 11,501,537 B2 | 11/2022 | Glaser et al. |
| 2003/0216969 A1 | 11/2003 | Bauer et al. |
| 2004/0260513 A1 | 12/2004 | Fitzpatrick et al. |
| 2005/0096997 A1 | 5/2005 | Jain et al. |
| 2007/0091177 A1 | 4/2007 | West et al. |
| 2007/0146873 A1 | 6/2007 | Ortyn et al. |
| 2007/0284440 A1 | 12/2007 | Birmingham et al. |
| 2010/0280956 A1 | 11/2010 | Chutorash et al. |
| 2012/0027297 A1 | 2/2012 | Feris et al. |
| 2013/0147963 A1 | 6/2013 | Henninger, I et al. |
| 2013/0215116 A1 | 8/2013 | Siddique et al. |
| 2013/0223673 A1 | 8/2013 | Davis et al. |
| 2013/0262269 A1 | 10/2013 | O'Leary |
| 2013/0284806 A1 | 10/2013 | Margalit |
| 2013/0335571 A1 | 12/2013 | Libal |
| 2013/0342688 A1 | 12/2013 | Siu |
| 2014/0082519 A1 | 3/2014 | Wang et al. |
| 2014/0082610 A1 | 3/2014 | Wang et al. |
| 2014/0188601 A1 | 7/2014 | Buset et al. |
| 2014/0214564 A1 | 7/2014 | Argue et al. |
| 2014/0263631 A1 | 9/2014 | Muniz |
| 2014/0272855 A1 | 9/2014 | Maser et al. |
| 2014/0285660 A1 | 9/2014 | Jamtgaard et al. |
| 2014/0330408 A1 | 11/2014 | Rolley |
| 2014/0372957 A1 | 12/2014 | Keane et al. |
| 2015/0025967 A1 | 1/2015 | Ellison |
| 2015/0046213 A1 | 2/2015 | Doreswamy et al. |
| 2015/0095189 A1 | 4/2015 | Dharssi et al. |
| 2015/0109451 A1 | 4/2015 | Dhankhar |
| 2015/0133190 A1 | 5/2015 | Fisher et al. |
| 2015/0227890 A1 | 8/2015 | Bednarek et al. |
| 2015/0327045 A1 | 11/2015 | Chang et al. |
| 2015/0373509 A1 | 12/2015 | Wang et al. |
| 2016/0063821 A1 | 3/2016 | MacIntosh et al. |
| 2016/0132854 A1 | 5/2016 | Singh |
| 2016/0217388 A1 | 7/2016 | Okanohara et al. |
| 2016/0224856 A1 | 8/2016 | Park et al. |
| 2016/0282039 A1 | 9/2016 | Motukuri et al. |
| 2016/0321506 A1 | 11/2016 | Fridental et al. |
| 2017/0030766 A1 | 2/2017 | Hendrick |
| 2017/0032182 A1 | 2/2017 | Motukuri et al. |
| 2017/0039613 A1 | 2/2017 | Kaehler et al. |
| 2017/0053171 A1 | 2/2017 | Buehler |
| 2017/0161703 A1 | 6/2017 | Dodia |
| 2017/0216667 A1 | 8/2017 | Garvey et al. |
| 2017/0249491 A1 | 8/2017 | MacIntosh et al. |
| 2017/0278175 A1 | 9/2017 | Park et al. |
| 2017/0332956 A1 | 11/2017 | Bigolin et al. |
| 2018/0012080 A1 | 1/2018 | Glaser et al. |
| 2018/0189763 A1 | 7/2018 | Olmstead et al. |
| 2018/0218562 A1 | 8/2018 | Conway |
| 2018/0232796 A1 | 8/2018 | Glaser et al. |
| 2018/0240180 A1 | 8/2018 | Glaser et al. |
| 2018/0300553 A1 | 10/2018 | Khosla et al. |
| 2018/0322209 A1 | 11/2018 | Jin et al. |
| 2019/0005479 A1 | 1/2019 | Glaser et al. |
| 2019/0054347 A1 | 2/2019 | Saigh et al. |
| 2019/0114488 A1 | 4/2019 | Glazer et al. |
| 2019/0116322 A1 | 4/2019 | Holzer et al. |
| 2019/0156274 A1 | 5/2019 | Fisher et al. |
| 2019/0156275 A1 | 5/2019 | Fisher et al. |
| 2019/0244161 A1 | 8/2019 | Abhishek et al. |
| 2019/0333039 A1 | 10/2019 | Glaser et al. |
| 2020/0066040 A1 | 2/2020 | Unnerstall et al. |
| 2020/0079412 A1 | 3/2020 | Ramanathan et al. |
| 2020/0134590 A1 | 4/2020 | Glaser et al. |
| 2020/0160670 A1 | 5/2020 | Zalewski et al. |
| 2020/0226523 A1 | 7/2020 | Xu et al. |
| 2020/0279240 A1 | 9/2020 | Glaser et al. |
| 2020/0394636 A1 | 12/2020 | Glaser et al. |
| 2021/0248382 A1 | 8/2021 | Glaser et al. |
| 2022/0044305 A1 | 2/2022 | Glaser et al. |
| 2022/0156827 A1 | 5/2022 | Glaser et al. |
| 2022/0261812 A1 | 8/2022 | Glaser et al. |
| 2022/0270063 A1 | 8/2022 | Glaser et al. |

FOREIGN PATENT DOCUMENTS

| | | |
|---|---|---|
| JP | 2012008746 A | 1/2012 |
| WO | 2016210354 A1 | 12/2016 |
| WO | 2019032304 A1 | 2/2019 |

OTHER PUBLICATIONS

Håkansson, "This is what the future gas station will look like",2016, https://web.archive.org/web/20160407025040/https://new.abb.com/ev-charging/articles/ev-charging-at-gas-stations (Year: 2016).*

U.S. Appl. No. 16/218,310, filed Dec. 12, 2018, William Glaser.

U.S. Appl. No. 17/083,136, filed Oct. 28, 2020, William Glaser.

U.S. Appl. No. 17/106,068, filed Nov. 27, 2020, William Glaser.

U.S. Appl. No. 17/398,306, filed Aug. 10, 2021, William Glaser.

U.S. Appl. No. 17/412,534, filed Aug. 26, 2021, William Glaser.

Cao, Jing, "An End to the Checkout Line?", Valley News [White River Junction, VT], Dec. 11, 2016 (Year: 2016).

Elizabeth Weise: "How Amazon's line-less grocery services might really work", Usatoday, Dec. 8, 2016 (Dec. 8, 2016), Retrieved from the Internet: URL: https://eu.usatoday.com/story/tech/news/2016/12/06/amazon-go-surveillance-cameras-shopping-grocery-supermarket/95055200/ [retrieved on Feb. 21, 2020] *the whole document*.

Zimmerman, Thomas G., Tracking Shopping Carts Using Cameras Viewing Ceiling-Mounted Retro-Reflective Bar Codes, Proceedings of the Fourth IEEE International Conference on Computer Vision Systems (ICVS 2006) (Year: 2006).

* cited by examiner

COMMERCE AUTOMATION FOR A FUELING STATION

CROSS-REFERENCE TO RELATED APPLICATIONS

This Application is a Continuation Application of U.S. patent application Ser. No. 16/667,859, filed on 29-Oct.-2019, which claims the benefit of U.S. Provisional Application No. 62/752,222, filed on 29-Oct.-2018, both of which are incorporated in their entirety by this reference.

TECHNICAL FIELD

This invention relates generally to the field of fueling station technology, and more specifically to a new and useful system and method for commerce automation for a fueling station.

BACKGROUND

The current market is seeing early explorations into new forms of commerce that attempt to leverage various forms of sensing like computer vision, RFID tags, and other forms of sensors. Many of these technologies have not solidified into widely distributed solutions, and as such they have not been widely explored. In particular, there is little in the way of sensor-based technical solutions on the interaction of vehicles and commerce.

In a similar manner, there are a wide number of changes happening in the fields of vehicles and transportation. The beginning of a transition to electric vehicles and autonomous driving is introducing changes in the relationship between people, vehicles, and communities. Yet, much of the infrastructure that currently serves people and vehicles has not changed.

Thus, there is a need in the fueling station and related vehicle-infrastructure fields to create a new and useful system and method for commerce automation. This invention provides such a new and useful system and method.

DESCRIPTION OF THE EMBODIMENTS

Figure 1:
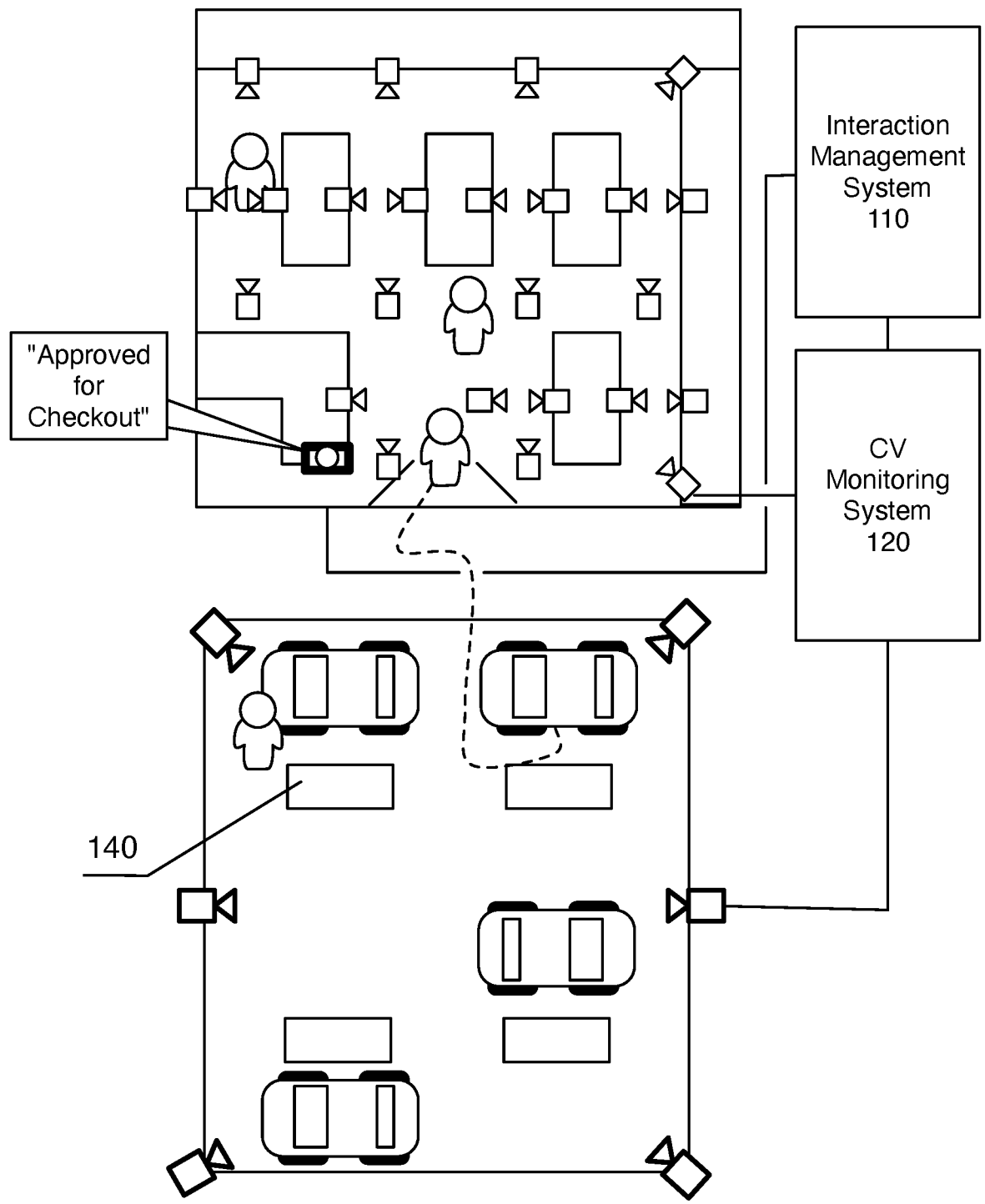
FIG. 1 is a schematic representation of a system of a first system.

The following description of the embodiments of the invention is not intended to limit the invention to these embodiments but rather to enable a person skilled in the art to make and use this invention.

1. Overview

A system and method enabling camera-based commerce for fueling stations and other vehicle-related environments functions to enable computer vision (CV) monitoring for more seamless and automated forms of commerce and related experiences when visiting a fueling station or other vehicle related destination. The system and method can similarly be applied in other vehicle-related scenarios such as a charging station, a parking structure, street parking, and/or other scenarios where a vehicle and vehicle related infrastructure could further retail-related interactions. In particular, the system and method make use of CV analysis of image data to extend digitally facilitated transactions initiated at a vehicle station to secondary commerce related events performed by vehicle-associated users.

Primarily, the system and method are directed to a fueling station store (i.e., a gas or petrol station) or charging station location (both of which are more generally described herein as a vehicle service site). The system and method when applied at such a vehicle service site may unify previously distinct transactions of paying for gas and purchasing of goods so that using a vehicle station can serve as the payment mechanism for both services (e.g., gas, charging, parking, etc.), goods, or other forms of commerce. Thereby, the use of a vehicle station site of the system and method can greatly enhance the user experience and reduce friction, which may serve both the customer and the business.

There could be numerous variations of automating commerce at a vehicle service site that leverage the system and method. The system and method may be used to enable primary users of the vehicle station and/or the vehicle to select a set of products or services for purchase that are automatically paid for based on use of the vehicle station. The system and method may additionally or alternatively be used in automatically controlling various forms of electronic devices such as enabling vending machines, unlocking doors (e.g., doors to amenities provided to customers), and/or controlling other suitable devices. The system and method, in another variation or instance of use, may be used in extending automated commerce experiences to multiple users of a vehicle (e.g., passengers of a car). In another variation, the monitoring system of the system and method may be used in detecting a payment mechanism through detection and identification of an account associated with a user/vehicle and using that for use of a vehicle station.

In one exemplary application of the system and method, a user provides payment information at a vehicle station (e.g., supplying a credit or debit card at a gas pump). The received payment mechanism then enables various forms of CV-enabled commerce. In particular, a vision system can identify a user at the vehicle station and track the user through one or more commerce regions (e.g., within the convenience store region of a fueling station). Using a CV monitoring system and/or other monitoring system, products selected within the retail region are detected, tracked, and accounted for within a digital checkout list associated with the user. Additionally or alternatively, tracked and/or measured usage of various services (e.g., dispensing a drink, ordering of a prepared food item, etc.) can similarly be tracked and accounted for as invoiced items within a digital checkout list. Upon leaving the commerce region or otherwise completing the shopping interaction, a transaction can be completed that includes at least the items of the checkout list. This transaction preferably applies the payment mechanism previously acquired for use with the vehicle station. In one implementation, this may include paying for gas and goods within one transaction. In another implementation, a first transaction may be made for gas and another automatic transaction applied for goods acquired using the automated or semi-automated forms of commerce.

In a related application of the system and method, a charging station used by electric vehicles may similarly use a mechanism wherein parking and using a charging station will result in acquiring a payment mechanism that enables one or more forms of automated commerce. Since electrical vehicle charging stations may be accompanied by longer wait times, there may be multiple commerce regions that can have various forms of automated commerce that use the acquired vehicle-associated payment mechanism.

The system and method may alternatively be applied in other usage scenarios. In one variation, the system can be adjusted for on-site or local services like restaurants or cafes. The system and method could similarly be adapted to vehicle-related infrastructure like parking lots or street parking. For example, individual parking meters or zone parking meters could be used to collect payment mechanism details which are then synchronized and applied to some form of automated commerce in nearby shops and locations. This could be used so that parking could similarly be used to pay for items in a nearby store. It may also open other forms vehicle-based forms of commerce such as automatic parking validation or crediting of parking time upon detecting a purchase in an associated commerce region.

In another exemplary application, the system and method may be used to enable automatic payment for all items by a group of users associated with a single payment mechanism. For example, all users (or a subset of users) exiting from a vehicle could be granted purchasing permissions (e.g., usage policy setting rules for price limits, product limits, user rules, etc.). Those permissions could change based on the door of the vehicle, properties of the user (e.g., age estimation), identity, and the like. In another variation, the system and method may be extended to other forms of commerce such as paying for services like car washes. For example, the system and method could facilitate collecting a payment mechanism for a vehicle station, tracking of a vehicle associated with the payment mechanism of the vehicle station to an automated car wash, and enabling the car wash in the event the payment mechanism can or has been applied for payment of a car wash.

As discussed in the exemplary variations above, many variations of the system and method are used in connection with a form of automated commerce. More specifically, the automated commerce is some form of automatic checkout.

Herein, automatic checkout is primarily characterized by a system or method that generates or maintains a checkout list (i.e., a digital virtual cart) during the shopping process of a user or users, with the objective of knowing the possessed or selected items for billing at the conclusion of some shopping interaction. The checkout process can occur when a customer is in the process of leaving a store. The checkout process could alternatively occur when any suitable condition for completing a checkout process is satisfied such as when a customer selects a checkout option within an application.

A checkout list may be maintained and tracked during a shopping experience. In performing an automatic checkout process, the system and method can automatically charge an account of a customer for the total of a shopping cart or collection of selected products. Alternatively, the system may enable automatically presenting the total transaction for customer and/or worker finalization at a payment terminal. For example, a payment terminal at the vehicle service site may be populated with the selected items and pre-approved with the payment mechanism so that the user only needs to confirm the items for purchase. Actual execution of a transaction may occur during or after the checkout process in the store. For example, a credit card may be billed after the customer leaves the store. In one variation, the payment due for use of the vehicle station and the selected items can be paid for in one electronic payment. Alternatively, single item or small batch transactions could be executed during the shopping experience. For example, automatic checkout transactions may occur for each item selection event. Checkout transactions may be processed by a checkout processing system through a stored payment mechanism, through an application, through a conventional PoS system, or in any suitable manner.

One variation of a fully automated checkout process may enable customers to select items for purchase (including produce and/or bulk goods) and then leave the store. The automated checkout system and method could automatically bill a customer for selected items in response to a customer leaving the shopping environment. The checkout list can be compiled using computer vision and/or additional monitoring systems. In a semi-automated checkout experience variation, a checkout list or virtual cart may be generated in part or whole for a customer. The act of completing a transaction may involve additional systems. For example, the checkout list can be synchronized with (or otherwise transmitted to) a point of sale (POS) system manned by a worker so that at least a subset of items can be automatically entered into the POS system thereby alleviating manual entry of the items.

In another exemplary implementation of the system and method, the system and method may include establishing of a payment mechanism through a CV monitoring system or another payment system and using the payment mechanism for use of a vehicle station. In this variation, the system and method may be used for electronic payment of use of the vehicle station with or without facilitation of automated commerce. In this variation, a payment mechanism, detected and associated with a CV monitored user, is used to activate and enable the use of a vehicle station. For example, a CV monitoring system associates a user of a vehicle at a vehicle service site to at least one payment mechanism record. When the user is tracked to be in proximity to a gas pump and/or initiate use of the gas pump, the gas pump station may automatically update state to fuel grade selection and otherwise enable the pumping of gas. The payment mechanism is preferably used in completing the electronic/digital transaction for the supplied gas from the gas pump station. Such control of a vehicle station may similarly be used for enabling an electric vehicle charger, paying for parking at a paid parking kiosk, or performing other suitable actions for other types of vehicle station.

In many preferred implementations, the system and method may accommodate forms of automated commerce for multiple distinct sets of users simultaneously using the vehicle service site. In other words, the system and method may operate simultaneously across multiple vehicle stations and users. For example, the system and method may involve tracking at least a first user associated with a second vehicle associated with a first vehicle station and independently tracking a second user associated with a second vehicle associated with a second vehicle station, wherein distinct instances of automated commerce are monitored and executed for the first and second user.

As one potential benefit, the system and method can serve to reduce friction to various forms of commerce. In particular, the system and method can remove at least one in-person checkout experience when buying items from the vehicle service site. This may make the option of purchasing items more convenient to a user, and therefore could promote increased sales based on the improvement to the user experience. This could potentially benefit the vehicle service businesses as well as the customers.

As a related potential benefit, the system and method can increase efficiency of a vehicle service site. There could be a dramatic reduction in lines and wait times even if only a portion of users take advantage of the camera-based forms of commerce.

As another potential benefit, the system and method can be used to provide innovative shopping experiences to a wide variety of types of customers. The system and method may not depend on prior registration, downloading an application, or other forms of enrollment. Standard use of a gas pump, for example, could be sufficient to access a payment mechanism to be used for camera-based commerce.

As another potential benefit, the system and method can incorporate such new forms of automated commerce in existing vehicle service sites—effectively upgrading existing infrastructure without expensive time consuming upgrades to the system infrastructure.

2. System

As shown in FIG. 1, a system for enabling camera-based commerce for fueling stations and other vehicle-related scenarios of a preferred embodiment is preferably implemented within a vehicle service site like a fueling station or charging station that has at least one vehicle station, and the system preferably includes an interaction management system 110, a computer vision monitoring system 120 with at least an imaging system in a commerce region and an imaging system in proximity to the at least vehicle station. The system may additionally include a checkout status signal device 130 to facilitate communicating status of a checkout process to a user and/or a worker. In some variations, the system preferably interfaces or communicates with a vehicle station, but the system may alternatively include a vehicle station 140.

A vehicle service site functions as an operating environment of the system. The system is preferably integrated into the structural and operational infrastructure of the commercial space. Two preferred variations of a vehicle service site can be a fueling station or an electric vehicle charging station, which will generally have one or more commerce regions in near proximity or integrated as part of the physical space of the vehicle service site. A vehicle service site will generally have one or more vehicle stations and at least one commerce region. There is preferably a set of vehicle stations that are generally characterized by having an individual point of interaction (e.g., pumping gas for one vehicle or charging a vehicle).

As used herein a vehicle service site is used as a primary example of an environment where the system and method may be applied. The environment of the system could similarly be extended to other vehicle related environments such as parking garages, parking lots, street parking, ferries, and/or other suitable environments where a vehicle may be associated with other commerce regions.

A commerce region generally characterizes a continuous or non-continuous region where checkout related interactions are monitored. This will generally be in any region with stored products for sale (e.g., a retail region). The commerce region is preferably an indoor convenience store, but may alternatively or additionally include outdoor regions with product offerings. As one potential benefit of the system, products could be displayed and presented on shelves outside near the vehicle stations for even greater convenience. A commerce region may additionally or alternatively include a region wherein a user may make use of service, a space, make an order or participate in commerce in any suitable manner. Cafes, restaurants, service oriented businesses, and/or other forms of commerce may additionally or alternatively operate and be supported within the commerce regions. A vehicle service site may additionally have multiple commerce regions. For example, there could be a convenience store, a souvenir store, and a fast food restaurant integrated with or participating with the system of the service site.

A vehicle station 140 functions as a point of interaction for a user. More specifically, the vehicle station 140 functions to deliver a primary service to a vehicle and user. The vehicle station 140 may additionally be used to collect a payment mechanism of a user. In general, the existing payment collection infrastructure built into a vehicle station and the user experience known by users is leveraged to enable expanding that experience to more seamlessly incorporate forms of automated commerce.

A vehicle station 140 generally characterizes a device or system used to service one or more vehicle. This could include variations such as a gas pump station, a charging station, a parking spot (paid, unpaid, assigned, etc.), and a parking meter. The vehicle station 140 will generally provide some other primary functionality such as providing fuel in the case of a gas pump, enabling charging in the case of a charging station, or permitting parking in the case of a parking meter. The vehicle station 140 in one preferred variation is a connected vehicle station 140 such that the system can interface with each vehicle station 140. A connected vehicle station 140 may communicate using a data connection over a network to a remote service like the interaction management system no. A vehicle station 140 for example may collect and provide payment information. In some variations, however, a payment mechanism may be collected outside of the vehicle station 140 and the vehicle station 140 includes a control interface whereby the state of the vehicle station can be updated so as to enable delivery of fuel or a charge, stopping dispensing of fuel or a charge, confirming parking time (for a parking meter), and/or making any suitable change to the vehicle station.

A vehicle station 140 may additionally provide a user interface through which various options of the system can be selected by a user. For example, a user may explicitly enable various forms of camera-based commerce automation for a given shopping experience by selecting an option when paying for fuel. The user interface may include displayed options for enabling automated commerce, setting default user options, setting passenger automated commerce options, confirming or completing a transaction made through automated commerce, and/or providing any suitable user input.

Figure 2:
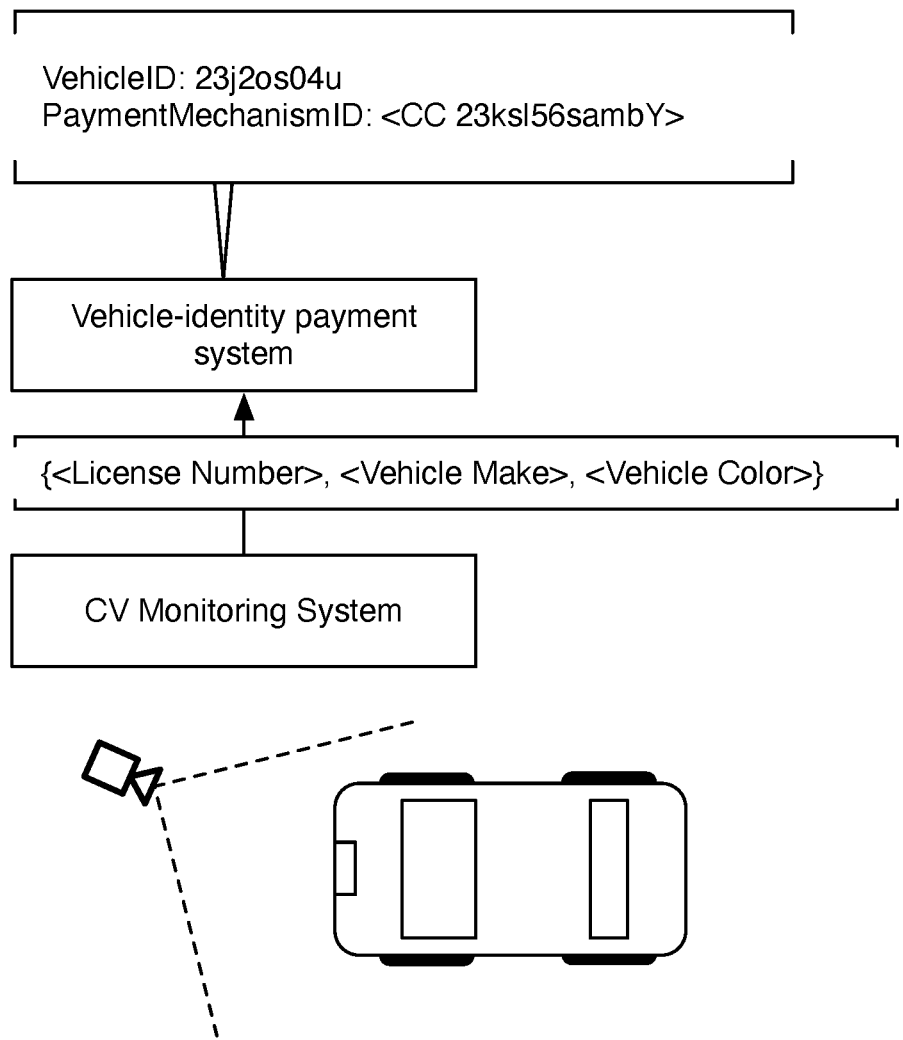
FIG. 2 is a schematic representation of an exemplary application of a vehicle-identity payment system.

While a preferred variation of the system includes integration with a vehicle station 140, alternative variations may facilitate such functionality through a separate device (e.g., used alongside a vehicle station). In another variation, an alternative payment mechanism such as vehicle-identity payment system could be used to remove dependency on a vehicle station as shown in FIG. 2. In this variation, a vehicle station 140 interface is used to enable the vehicle station for use. In one implementation for a fueling station site, a cash register control system with control access to the vehicle stations at the site is communicatively coupled to the interaction management system no. Upon the interaction management system 110 collecting a payment mechanism of a user and detecting intended use of a vehicle station by the user, enabling the vehicle station 140 through the control system. Enabling the vehicle station may include transmitting a control signal to the cash register control system that then activates the vehicle station.

In some variations, the system may include a vehicle-identity payment system as mentioned above, which functions to remotely identify a vehicle. That vehicle identity may be linked to a payment mechanism. For example, a user may be enabled to register a payment mechanism in association with an account linked to the vehicle identity. The vehicle-identity payment system may use the CV monitoring system 120 to visually detect and identify a vehicle using one or more approaches such as license plate reading, vehicle make/model classification, user identification, and the like. Additionally or alternatively, other forms of vehicle identification may be used. For example, an RFID tag, beaconing, vehicle GPS, and/or other suitable forms of identification may be used to detect the vehicle through a wireless signal. A vehicle-identity payment system may be used so that payment mechanism can be seamlessly applied to use of the vehicle station and/or automated commerce.

A CV monitoring system 120 functions to process and generate conclusions from one or more sources of image data. The CV monitoring system 120 preferably transforms image data collected within the environment into observations relating in some way to items in the environment. The CV system can be configured to perform person detection; person identification; person tracking; object detection; object classification (e.g., product identification); object tracking; extraction of information from device interface sources; gesture, event, or interaction detection; scene description; and/or any suitable form of information collection using computer vision and optionally other processing techniques. More preferably, the CV monitoring system 120 is configured to perform a sequence of the above processes in a coordinated manner for more advanced tracking. The CV monitoring system 120 is preferably used to drive CV-based applications of the interaction management system 100. In the case of CV-driven retail, the CV-driven imaging system may facilitate generation of a checkout list (i.e., a virtual cart) for users in the commerce region based on interactions between people and products.

A CV monitoring system 120 will include at least one form of an imaging system that functions to collect image data within the environment of the vehicle service site. More specifically, the CV monitoring system 120 will include an imaging system in a commerce region and an imaging system in proximity to the at least vehicle station. These two imaging systems may be the same imaging system. Alternatively, they may be different sub-components of one imaging system. In general, the imaging requirements in the commerce region will differ from those in the region of the vehicle station.

The imaging system in the retail system is preferably used in facilitating automated commerce. The retail imaging system will preferably utilize more ubiquitous monitoring that covers all the products.

The imaging system in the vehicle station region may be used primarily to establish and/or tracking of users associated with a vehicle, vehicle station, and/or payment mechanism and then linking that to monitoring in the commerce region. The vehicle stations may be monitored using imaging system with a coordinated number of imaging devices trained on the various aspects. For example, a small subset of image capture device may collect image data from each vehicle station from a set of different vantage points. Additionally or alternatively, an image capture device may be positioned and mounted in the vehicle service site so as to collect vehicle identifying information like license plate information.

Accordingly, the CV monitoring system 120 may include a vehicle servicing region imaging system (for identifying and tracking users outside of the commerce region), a commerce imaging system (for tracking user product interactions in the commerce region), and in some variations a vehicle imaging system (for identifying a vehicle).

An imaging system preferably includes a set of image capture devices. The imaging system might collect some combination of visual, infrared, depth-based, lidar, radar, sonar, and/or other types of image data. The imaging system is preferably positioned at a range of distinct vantage points and preferably forms substantially ubiquitous monitoring within the environment (e.g., particularly for the commerce region) as described below. However, in one variation, the imaging system may include only a single image capture device or a limited number of image capture devices. The image data is preferably video but can alternatively be a set of periodic static images. In one implementation, the imaging system may collect image data from existing surveillance or video systems. The image capture devices may be permanently situated in fixed locations. Alternatively, some or all may be moved, panned, zoomed, or carried throughout the facility in order to acquire more varied perspective views. In one variation, a subset of imaging devices can be mobile cameras (e.g., wearable cameras or cameras of personal computing devices).

In one variation, a subset of imaging devices can be mobile cameras (e.g., wearable cameras or cameras of personal computing devices). For example, in one implementation, the CV monitoring system 120 could operate partially or entirely using personal imaging devices worn by agents in the environment. The image data collected by the agents and potentially other imaging devices in the environment can be used for collecting various interaction data.

In a preferred implementation, at least a subset of the image capture devices are oriented for over-head monitoring, wherein the image capture devices collect a substantially aerial perspective. In a shopping environment, the imaging system preferably includes a set of statically positioned image devices mounted with an aerial view from the ceiling. The aerial view imaging devices preferably provide image data across stored products monitored for virtual cart functionality. The image system is preferably installed such that the image data covers the area of interest within the environment (e.g., product shelves). In one variation, imaging devices may be specifically setup for monitoring particular items or item display areas from a particular perspective.

Herein, ubiquitous monitoring (or more specifically ubiquitous video monitoring) characterizes pervasive sensor monitoring across regions of interest in an environment. Ubiquitous monitoring will generally have a large coverage area that is preferably substantially continuous though discontinuities of a region may be supported. Additionally, monitoring may monitor with a substantially uniform data resolution or at least resolution above a set threshold. In some variations, a CV monitoring system 120 may specifically have an imaging system with only partial coverage within the environment. For example, a CV monitoring system 120 used for secondary monitoring may generate a partial checkout list.

Large coverage, in one example, can be characterized as having greater than 95% of surface area of interest monitored. In a shopping environment, this can mean the shelves and product displays as well as the shopping floor are monitored. Substantial uniform data resolution preferably describes a sensing configuration where the variability of image resolution and/or coverage of different areas in the environment are within a target range. In the exemplary case of automatic checkout CV-driven applications, the target range for image resolution is sufficient to resolve product-packaging details for product identification.

Ubiquitous monitoring may optionally include the characteristic of redundant monitoring. This may involve having redundant coverage from multiple vantage points. For example, an item on a shelf may be visible by two different cameras with adequate product identification resolution and where the cameras view the item from different perspectives. In an environment like a convenience store this could mean 10-200 cameras distributed over an aisle or general region of the store in some exemplary implementations. Though ubiquitous monitoring is not a requirement for all variations described herein.

Similarly, the system may additionally include other computer input or output devices across an environment. The system and method can be used in the collection of sensor data and/or generation of an output in addition to or as an alternative to video and/or image data. Other forms of devices such as microphones, Bluetooth beacons, speakers, projectors, and other suitable devices could additionally or alternatively be integrated into system modules that may be installed across an environment. These additional sensors in some variations may be used in combination within a single monitoring system.

In a commerce region, the CV monitoring system 120 can be configured to track a checkout list for automatic checkout and/or other forms of automated commerce. In one variation, the CV monitoring system 120 may be used to generate a virtual cart, which may perform in a manner substantially similar to the system and method described in US Patent Application publication No. 2017/0323376, filed 9-May-2017, which is hereby incorporated in its entirety by this reference.

The CV monitoring system 120 can include a CV-based processing engine and data management infrastructure. The CV-based processing engine and data management infrastructure preferably manages the collected image data and facilitates processing of the image data to establish various modeling and conclusions relating to monitoring objectives. For example, the selection of an item and the returning of an item are of particular interest. The data processing engine preferably includes a number of general processor units (CPUs), graphical processing units (GPUs), microprocessors, custom processors, FPGA's, and/or other computing components. The computing components of the processing engine can reside local to the imaging system 112 and the environment. The computing resources of the data processing engine may alternatively operate remotely in part or whole.

The CV monitoring system 120 may additionally or alternatively include human-in-the-loop (HL) monitoring which functions to use human interpretation and processing of at least a portion of collected sensor data. Preferably, HL monitoring uses one or more workers to facilitate review and processing of collected image data. The image data could be partially processed and selectively presented to human processors for efficient processing and tracking/generation of a virtual cart for users in the environment.

The various CV-based processing modules are preferably used in generating user-item interaction events, a recorded history of user actions and behavior, and/or collecting other information within the environment. The CV-based processing modules may include item detection module; user-item interaction module; person detection and/or tracking module; person identification module; various gesture, event, or interaction detection modules; and/or other suitable modules. A module herein characterizes a non-transitory computer-readable medium storing instructions that, when executed by one or more computer processors of a computing platform, cause the computing platform to perform operations related to the relevant actions described herein. A module may be implemented as software executed on a processor and computer system and/or as a circuit.

The item detection module of a preferred embodiment, functions to detect and apply an identifier to an object. The item detection module preferably performs a combination of object detection, segmentation, classification, and/or identification. This is preferably used in identifying products or items displayed in a store. Preferably, a product can be classified and associated with a product SKU identifier. In some cases, a product may be classified as a general type of product. For example, a carton of milk may be labeled as milk without specifically identifying the SKU of that particular carton of milk. An object tracking module could similarly be used to track items through the store.

In a successfully trained scenario, the item detection module properly identifies a product observed in the image data as being associated with a particular product identifier. In that case, the CV monitoring system and/or other system elements can proceed with normal processing of the item information. In an unsuccessful scenario (i.e., an exception scenario), the item detection module fails to fully identify a product observed in the image data. An exception may be caused by an inability to identify an object, but could also be other scenarios such as identifying at least two potential identifiers for an item with sufficiently close accuracy, identifying an item with a confidence below a certain threshold, and/or any suitable condition whereby a remote item labeling task could be beneficial. In this case, the relevant image data is preferably marked for labeling and/or transferred to a product mapping tool for human assisted identification.

The item detection module in some variations may be integrated into a real-time inventory system. The real-time inventory system functions to detect or establish the location of inventory/products in the environment. The real-time inventory system can manage data relating to higher level inventory states within the environment. For example, the inventory system can manage a location/position item map, which could be in the form of a planogram. The inventory system can preferably be queried to collect contextual information of an unidentified item such as nearby items, historical records of items previously in that location, and/or other information. Additionally, the inventory system can manage inventory data across multiple environments, which can be used to provide additional insights into an item. For example, the items nearby and/or adjacent to an unidentified item may be used in automatically selecting a shortened list of items used within the product mapping tool.

A person identification module can be a similar module that may be used to uniquely identify a person. This can use biometric identification. Alternatively, the person identification module may use Bluetooth beaconing, computing device signature detection, computing device location tracking, and/or other techniques to facilitate the identification of a person. Identifying a person preferably enables user history, settings, and preferences to be associated with a person. A person identification module may additionally be used in detecting an associated user record or account. In the case where a user record or account is associated or otherwise linked with an application instance or a communication endpoint (e.g., a messaging username or a phone number), then the system could communicate with the user through a personal communication channel (e.g., within an app or through text messages). Accordingly, a person identification module may be used in collecting a payment mechanism that was stored in association with a user record/account.

Additionally, person identification and object detection/identification for vehicles and/or vehicle station can be used in detecting and establishing temporary associations between users, vehicle station, and vehicles so that payment mechanisms established through one of those channels can be applied across other objects in that association. The temporary associations preferably last for the duration of a user and/or vehicle visit to the vehicle service site. In one variation, person identification may be used to detect presence of a user to a vehicle station thereby establishing association between the person and the vehicle station. A payment mechanism collected in association with the vehicle station may then be associated with actions of that user. In another variation, vehicle detection and identification can be used in a similar way. Detected presence of a vehicle in active use of a vehicle station (e.g., detected as being park or stationary next to or in position for use of the vehicle station) may establish an association between the vehicle and the vehicle station. In yet another variation, users detected in proximity to a vehicle may be associated with a vehicle. This may be applied so that passengers of the vehicle can also be permitted to make use of the payment mechanism when participating in automated commerce.

User-item interaction processing modules function to detect or classify scenarios of users interacting with an item (or performing some gesture interaction in general). User-item interaction processing modules may be configured to detect particular interactions through other processing modules. For example, tracking the relative position of a user and item can be used to trigger events when a user is in proximity to an item but then starts to move away. Specialized user-item interaction processing modules may classify particular interactions such as detecting item grabbing or detecting item placement in a cart. User-item interaction detection may be used as one potential trigger for an item detection module.

A person detection and/or tracking module functions to detect people and track them through the environment. People tracking is preferably used in tracking a user between a vehicle station and commerce regions. Tracking may be continuous wherein a path of the user can be continuously monitored in video image data. Tracking may alternatively be discontinuous wherein a discrete instances or windows of user detection and identification can be used to compile a non-continuous history of user location in the environment. Instances of discontinuous tracking can be used when a user is occluded from view or when the imaging system does not have continuous coverage of the environment.

A gesture, event, or interaction detection modules function to detect various scenarios involving a user. One preferred type of interaction detection could be a user attention tracking module that functions to detect and interpret user attention. This is preferably used to detect if, and optionally where, a user directs attention. This can be used to detect if a user glanced in the direction of an item or even if the item was specifically viewed. A location property that identifies a focus, point, or region of the interaction may be associated with a gesture or interaction. The location property is preferably 3D or shelf location "receiving" the interaction. An environment location property on the other hand may identify the position in the environment where a user or agent performed the gesture or interaction.

Alternative forms of CV-based processing modules may additionally be used such as user sentiment analysis, clothing analysis, user grouping detection (e.g., detecting families, couples, friends or other groups of users that are visiting the store as a group), and/or the like. The system may include a number of subsystems that provide higher-level analysis of the image data and/or provide other environmental information such as a real-time virtual cart system.

The real-time virtual cart system functions to model the items currently selected for purchase by a user. The real-time virtual cart system may additionally be used in defining various user-item interactions such as selecting an item for purchase, purchasing an item, deselecting an item for purchase, and/or other purchase-related events. The virtual cart system may additionally enable automatic self-checkout or accelerated checkout or other forms of automated commerce. Product transactions could even be reduced to per-item transactions (purchases or returns based on the selection or de-selection of an item for purchase).

The commerce imaging system and the CV monitoring system 120 is preferably employed to manage the generation of a checkout list or monitor the other forms of interactions associated with the particular form or commerce. The commerce imaging system is preferably applied to the monitoring of commerce activity by the CV monitoring system 120.

The vehicle-servicing region imaging system and the CV monitoring system 120 is preferably configured to initiate tracking of at least one user that is associated with a payment mechanism.

In one variation, the association of a payment mechanism and a user is established by identifying a user supplying payment mechanism to a vehicle station and, through the vehicle station, receiving access to a payment mechanism. In this way when a user supplies their form of payment (e.g., credit card or debit card), the CV monitoring system 120 can establish a verified connection between that user as observed through CV processing of the image data and a payment mechanism that can be used later when shopping in the commerce region.

In another variation, a vehicle imaging system or other suitable vehicle-identity payment system will supply a payment mechanism by detecting a car that is associated with a payment mechanism. In this case, users are tracked in association with their originating vehicle. The payment mechanism associated with the vehicle can then be applied to users visually mapped to the vehicle. This user-to-vehicle mapping can additionally be used when the payment mechanism is supplied through a vehicle service station.

User-to-vehicle mapping can be used to enable group commerce automation for multiple users. For example, all passengers of a vehicle may be permitted to select items for purchase, and the collective set of selected items can be paid for through the collected payment mechanism. Various rules or permissions may additionally be set. These permissions could be pre-configured by an administrator such as by the person setting up an account for the vehicle. Pre-configured permissions could additionally specify various rules and checkout limitations that depend on user/passenger identity, passenger age (e.g., using CV age estimation), seating position (e.g., driver, front-seat, back-seat, etc.), and the like. These permissions may alternatively set for an individual visit. For example, when providing the payment mechanism at the pump there may be two options displayed through a user interface of a vehicle station 140: "Enable automatic checkout for driver" and "Enable automatic checkout for all vehicle passengers". Received user selection of one of these options can enable automated commerce. In another variation, group commerce automation may be enabled through detection of a visually detectable gesture, where a primary user (e.g., the user supplying the payment mechanism) anoints selected users with the capability to use their payment mechanism. For example, after supplying a payment mechanism, the user may tap each user that has permission to purchase items.

The interaction management system 110 of a preferred embodiment functions to manage interaction state between the CV monitoring system 120 and a collected payment mechanism (via a vehicle station or other systems) for the purposes of facilitating commerce automation. Commerce automation can come in a variety of forms such as checkout-free shopping or expedited checkout at a checkout kiosk. Commerce automation may also be used for automatic tab payment for used services or amenities. In both variations, the interaction management system 110 is configured associate a user with a payment mechanism, track the user, manage a checkout list in coordination with user-product interactions detected through the CV monitoring system 120, and initiating transactions for a checkout list using the collected payment mechanism.

In yet another variation, the interaction management system no may be used for controlling connected systems in the vehicle service site. For example, a door could be automatically unlocked in response to a communicated command from the interaction management system no. The interaction management system no could detect verified customers of the vehicle service site and through CV tracking of the verified users automatically unlock the door when the user is in proximity to the door.

In alternative applications, the system may be used for commerce automation in a restaurant or cafe setting where a user orders food. In that case, the CV monitoring system 120 can be used to track an association of a user back to a payment mechanism. The POS system used to collect the order at the restaurant/cafe may interface with the interaction management system 110 so that collected orders can be charged to the collected payment mechanism.

The interaction management system 110 may be partially or wholly remotely hosted in a networked computing platform. The interaction management system 110 may alternatively be partially or fully hosted local to the vehicle service site.

The system may additionally or alternatively include a checkout status signal device, which functions to communicate to involved parties (e.g., customers and workers) of the status of a checkout process. In some instances, especially during the initial adoption of the system, a form of feedback could be beneficial to customers, workers, and other users. The checkout status signal device can preferably provide such feedback. The checkout status can communicate a variety of signals such as "automatic checkout is enabled" (e.g., a payment mechanism is collected and ready for use, user selected the option for automatic checkout, etc.), automatic checkout is not enabled" (e.g., no payment mechanism registered, user did not select option to enable, issue with checkout list, etc.), "successful checkout" (e.g., checkout processing can successfully complete when a user exits"), "failed checkout" (e.g., some issue prevents a user from checking out using the system), and/or other suitable signals.

In one variation, a checkout status signal can be positioned in proximity to the vehicle-servicing region and in particular next to or at the vehicle station (e.g., the gas pump). As one exemplary implementation, the gas pump payment kiosk can serve as the status signal device. For example, confirmation of an enabled checkout-free experience can be communicated through the display or a speaker of the payment kiosk. As another implementation, a device separate from the gas pump payment kiosk can signal similar information but using a separate display or audio system.

In another variation, the checkout status signal can be positioned within a commerce region such as near the checkout region or near the exit/entrance of a store. In one implementation, the checkout status signal can be at or integrated with a point of sale unit at a checkout station of the vehicle service site. In one implementation, users may still be requested to perform some form of "checkout" process within the commerce region. However, this could serve as basic validation and checkout-point in the process, which may be to serve the users understanding of the checkout process as much as those of the business. In one example, the checkout status signal may be integrated into a POS connected system such that when a tracked user is detected or selected for checkout, a visual or audio interface can signal that: a) the user has the checkout process enabled through a vehicle-associated mechanism, and b) a valid checkout list was created and ready for checkout. In one implementation, the POS system may display a message like "Customer from pump 4 is confirmed for checkout" for a user with a valid checkout list. The worker may provide confirmation that the system has automatically entered their selected items and it will be charged to the payment mechanism used to pay for their gas.

3. Method

Figure 3:
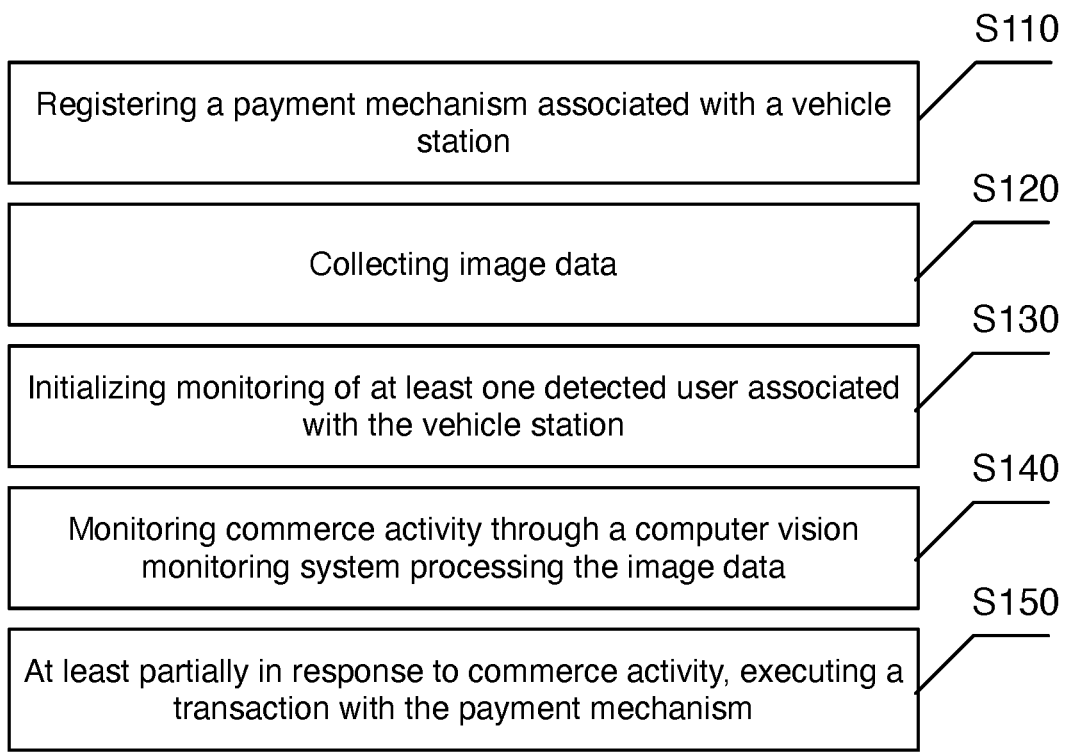
FIG. 3 is a flowchart representation of a first method.

As shown in FIG. 3, a method for enabling camera-based commerce for fueling stations and other vehicle-related scenarios of a preferred embodiment includes: registering a payment mechanism associated with a vehicle station S110; collecting image data S120; initializing monitoring of at least one detected user associated with the vehicle station S130; monitoring commerce activity through a computer vision monitoring system processing the image data S140; and at least partially in response to commerce activity, executing a transaction with the payment mechanism S150. The method is preferably used for facilitating an automated electronic transaction at a vehicle service site such as a gas fueling station site, an electric vehicle charging site, a paid parking, and/or other suitable vehicle service sites.

The method preferably executes in multiple simultaneous instances across multiple users at a vehicle service station. The method is preferably implemented by a system such as the one described above, but any suitable system may alternatively be used in implementing the method.

Block S110, which includes collecting a payment mechanism associated with a vehicle station, functions to identify or register a payment mechanism that can be applied to a potential transaction made through commerce automation. Collecting of a payment mechanism is preferably performed for a particular instance of a vehicle visiting a vehicle service site and more specifically a vehicle station. The payment mechanism may additionally or alternatively be performed in association with one or more users. In other words, a payment mechanism is preferably collected for each instance of use where a car makes use of a vehicle station.

In one variation, collecting a payment mechanism involves receiving payment credentials and holding them for a future transaction (e.g., pre-authorizing a purchase amount). For example, a credit card number or digital payment access may be obtained and stored for future use. In another variation, collecting a payment mechanism may involve receiving payment credentials and adding payment credit to an account. The payment credit may be used towards subsequent purchases made through automated commerce and/or other transactions. The payment credit is preferably added as a data record in a database or storage system, wherein the record is stored in or associated with an account/user profile data record. Collecting a payment mechanism may accordingly include detecting an account and accessing and verifying the payment credit. For example, a user interface of a vehicle station may facilitate adding money to an account and/or displaying available balance of added payment credit. A user could add more money if necessary, prior to participating in an automated commerce interaction.

Figure 4:
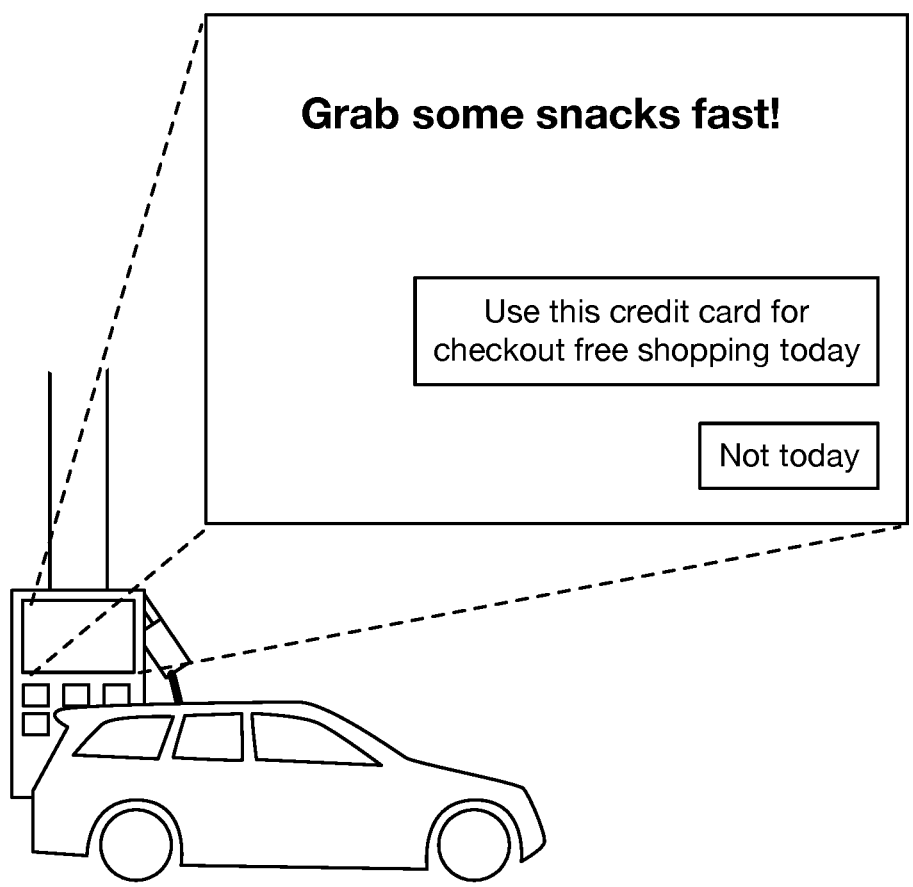
FIG. 4 is a schematic representation of receiving payment authorization at a vehicle station.

Collecting a payment mechanism can be performed in coordination with collecting payment credentials for a primary service such as fuel purchase, charging, or parking. In one preferred implementation, collecting a payment mechanism includes receiving payment authorization for the payment mechanism from a payment interface at the vehicle station, which functions to receive access to the supplied payment mechanism and permission to use the payment mechanism as shown in FIG. 4. The supplied payment information is preferably used for both the primary service performed at the vehicle station and related retail transactions as generated by the method. To the user, supplying such payment can occur in a substantially similar manner to a typical vehicle station such as swiping a credit card for filling a vehicle with gas. When a user supplies their form of payment (e.g., credit card or debit card), the CV monitoring system can establish a verified connection between that user and a payment mechanism that can be used later when shopping in the commerce region. The payment mechanism can include a payment card reader used to read a credit card, debit card, cash card, membership card, and/or any suitable physical card. The payment mechanism may additionally or alternatively include other mediums of digital payment such as mobile payment or digital wallet. Such digital payment options may make use of a payment verification system like NFC, RFID, visible codes (e.g., barcodes, QR codes, etc.), biometric verification, and/or other technical systems. The vehicle station may facilitate reading a card or otherwise receiving payment verification.

The payment authorization for use of the payment mechanism may be presented as authorization for permission to use the payment mechanism in one connected automated commerce experience. For example, a user may be presented with the option at a gas fueling station with the option, "Would you like to use this card to pay for items purchased during a checkout-free experience?" If a positive confirmation is received, the payment mechanism is registered and monitoring may be enabled. If a negative confirmation is received, automated checkout may be disabled (i.e., not enabled) unless done so through another mechanism.

Additionally, receiving user-supplied authorization for use of the payment mechanism may include setting default authorization for a payment mechanism, which functions to enable a user to set default settings for automated checkout. Therefore, a payment mechanism may be selectively used one time or be authorized to be automatically used towards automated commerce when the payment mechanism is detected.

An account, as referenced herein, may refer to an explicit user account managed by the user that accesses the account using user credentials and/or performing some form of authorization. However, in some cases, an account may be an internal account or data record stored in association with an identifiable object. An internal account may be associated with identifiable objects such as the payment mechanism or a visual identification profile of a user and/or car. Any suitable scope of an account may alternatively be used.

In another variation, a payment mechanism may be stored in association with an account identifier. In one preferred variation, a payment mechanism can be registered and associated with an account. That account is preferably linked and identifiable by some identifying signal/properties. A vehicle-identifying signal could be visually identifying properties such as a license plate, make/model of the vehicle, and/or other properties. The vehicle-identifying signal could alternatively be a wireless signal such as an RFID tag, Bluetooth beacon, or the like. The vehicle-identifying signal may alternatively originate from the vehicle. In such a variation, a vehicle may sense and/or detect the vehicle service site and/or the particular vehicle station to which it is parked. For example, a camera on the vehicle could detect an identifying graphical code on a fueling station and then communicate to an interaction management system the location of the vehicle. The vehicle can additionally include detecting location (e.g., using GPS or another geolocation sensing system.), which can be used to determining when a vehicle is in proximity to a vehicle service site. Transmitting and receiving the communication indicating account presence at a vehicle site can be used in accessing the associated payment mechanism thereby selecting the payment mechanism as the collected payment mechanism for use in association with a particular vehicle station.

Figure 5:
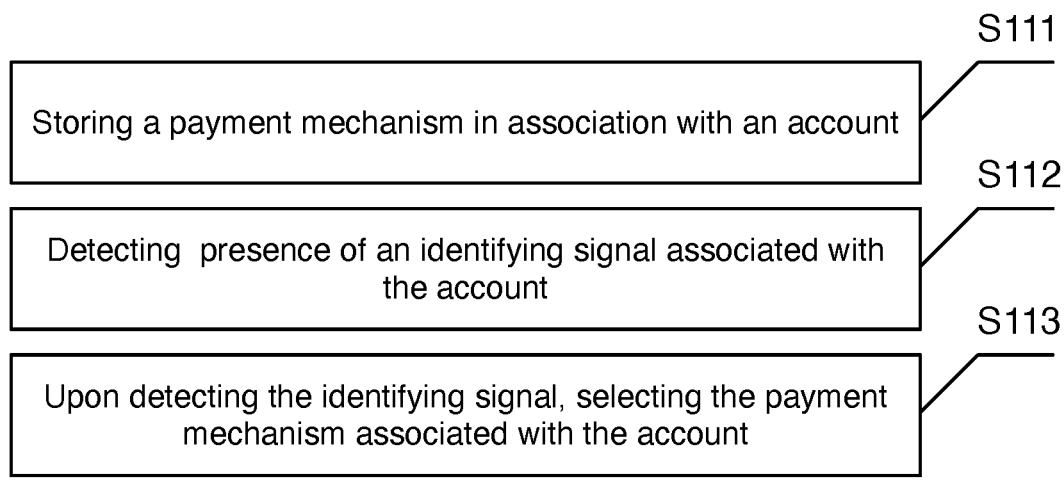
FIG. 5 is a flowchart representation a variation of a collecting payment mechanism involving detection of an identifying signal.

In an account identifying variation, collecting a payment mechanism includes storing a payment mechanism in association with an account S111, detecting presence of an identifying signal associated with the account S112, and upon detecting the identifying signal, selecting the payment mechanism associated with the account S113 as shown in FIG. 5. Detecting presence of an identifying signal is preferably sensed wherein it includes detecting the identifying signal in proximity to a vehicle station or similarly sensing or detecting the identifying signal for a vehicle, user, or device in proximity to a vehicle station. The selected payment mechanism through detection of an identifying signal of an account can then be used as the payment mechanism for use of the vehicle station and/or one or more automated commerce interactions during that visit to the vehicle station.

Detecting presence of the identifying signal may include sensing and/or receiving communicated indication of presence. In one variation, detecting presence includes sensing presence through CV processing of image data. In another variation, detecting presence includes detecting a wirelessly communicated identifier such as reading a vehicle-identifying signal communicated through wireless signal such as an RFID tag, Bluetooth beacon, or the like. Detecting a wirelessly communicated identifier could alternatively be performed by detecting presence of a user computing device like a phone, connected watch, connected glasses, and/or any suitable computing device that will generally include a processor and a wireless communication device.

In one variation, CV processing and monitoring of image data may be used in facilitating sensing of the identifying signal. Accordingly, detecting presence of an identifying signal associated with the account can include detecting the identifying signal through CV processing of the image data. Detecting the identifying signal through CV processing of the image data can include performing image object detection and/or classifying and/or profiling detected objects. Detection can be performed using any suitable computer vision, machine learning, neural network/deep learning analysis, heuristic algorithms, and/or any suitable techniques.

In one variation, CV processing can be used in identifying a vehicle through CV processing of collected image data, which can include detecting a vehicle (e.g., car, truck, motorcycle, etc.), reading of a license plate and/or detecting vehicle properties such as make and model as shown in FIG. 2. Identifying a vehicle through CV processing may additionally include detecting unique vehicle properties such modifications (e.g., roof racks, decals), interior objects (e.g., car seats, parking tags, etc.), performing passenger/human identification, and/or detecting other vehicle related properties or qualities that may be used to uniquely identify a vehicle. The identity of the identified vehicle is preferably associated with an account that has at least one associated payment mechanism stored. The payment mechanism may have been originally collected and associated with the vehicle in response to previous instance of collecting payment mechanism.

In another variation, CV processing can be used in identifying a user. CV processing of image data can include detecting a human and performing biometric or other forms of identification. Preferably, security safeguards are taken for identity protection of the user. In one variation, identifying a user may be performed in combination with identifying or at least identifying properties of a vehicle.

In another variation, detecting presence of an identifying signal associated with the account can include detecting device presence at the location of the vehicle service state. Detecting a device preferably detects a phone, connected watch, connected glasses, and/or any suitable computing device that will generally include a processor and a wireless communication device. The device may be a personal computing device of a user wherein detection of a device may imply a user is present. The device may alternatively be a vehicle associated computing device wherein detection of the device implies presence of the vehicle. An application installed on the mobile computing device may facilitate transmitting the identifying signal. In one variation, geofencing may be configured through the application and used in transmitting a communication when the device location is detected to be near the vehicle service site. Alternatively, the device may be detected passively through broadcasted RF signals, Bluetooth beaconing, Wi-Fi connections, and/or other suitable approaches.

Alternatively, a payment mechanism could be stored in association with some other user identifier such as a rewards program identifier like a phone number. For example, if a user types in a user identifier before pumping gas, then that may be used to access a pre-configured payment mechanism.

In some variations, collecting the payment mechanism may additionally be used in enabling a vehicle station. Enabling of the vehicle station may be performed by the method when the payment mechanism is collected from the interaction management system (e.g., by detecting an identifying signal of an account) or otherwise collected from outside of the vehicle station/vehicle service site.

Figure 6:
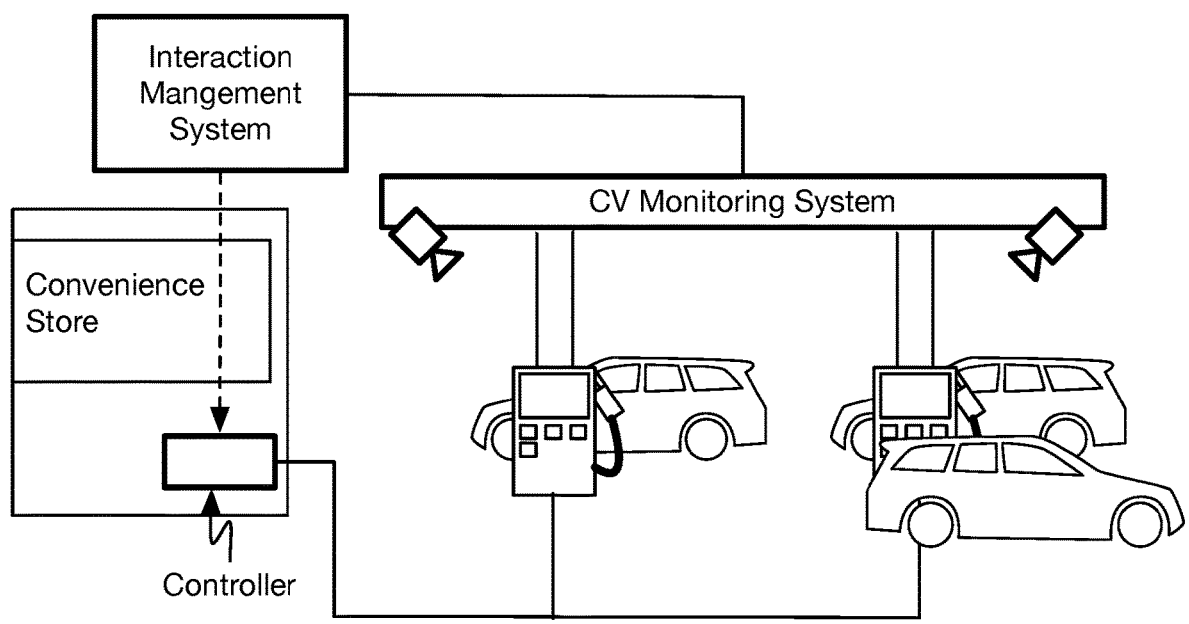
FIG. 6 is a schematic representation of a variation wherein vehicle identification can be used in transmitting a control signal to a controller of a vehicle station.

Enabling of the vehicle station preferably includes, in response to collecting the payment mechanism associated with a vehicle station, transmitting a vehicle station command signal as shown in FIG. 6. The vehicle command signal preferably thereby activates or enables the vehicle station for use. Activating or enabling for use preferably includes updating the state of the vehicle station to a payment received state. When the vehicle station is a gas pump/fueling station or an electric vehicle charging station, the command signal is preferably communicated to a controller that then activates the gas pump for selection and/or use of the gas pump. In the case of a fueling station service site, the controller may be the fueling cash register or a computing device communicatively coupled to the cash register to activate the appropriate vehicle station (e.g., gas pump) at which the vehicle is detected. When the vehicle station is an electric vehicle charging station, the command signal is preferably communicated to the controller that activates the charging plug for charging (supplying of an electrical charging current). When the vehicle station is a parking meter kiosk or device, the command signal may indicate verification of a payment mechanism used to pay for parking. The command signal may additionally (depending on the type of parking meter) the vehicle spot location, a payment amount for payment of a set amount of parking, and/or other information used by the parking meter.

Figure 7:
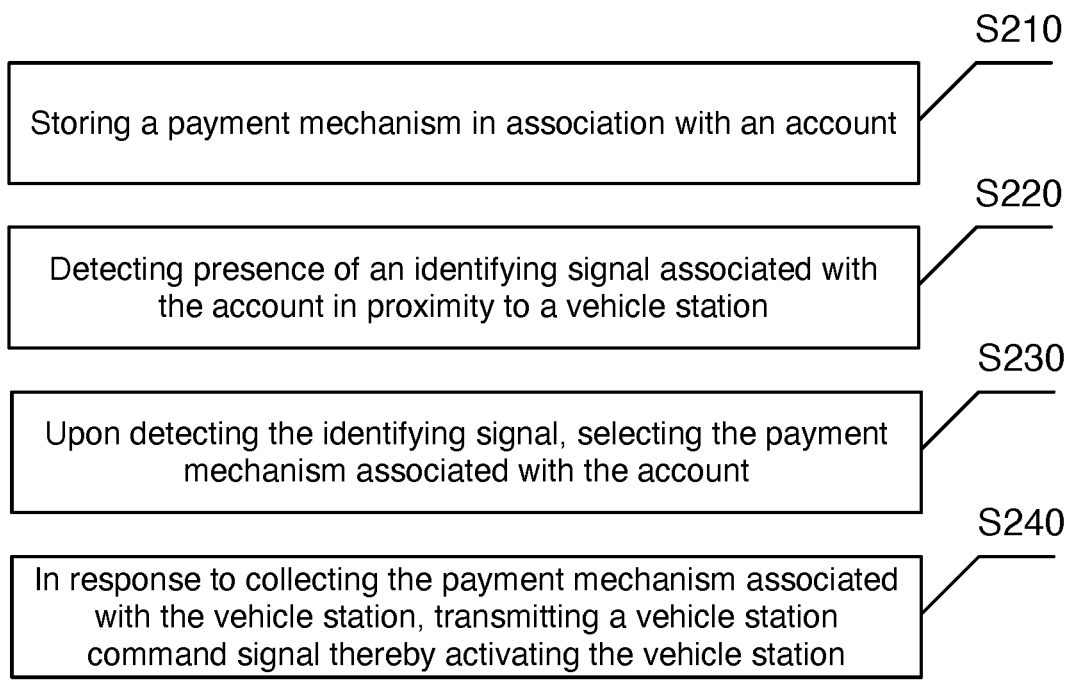
FIG. 7 is a flowchart representation of a variation of a method for applying a detected identifying signal to electronic payment of a vehicle station may.

Accordingly, a method for applying a detected identifying signal to electronic payment of a vehicle station may include as shown in FIG. 7: storing a payment mechanism in association with an account S210; detecting presence of an identifying signal associated with the account in proximity to a vehicle station S220; upon detecting the identifying signal, selecting the payment mechanism associated with the account S230; and, in response to collecting the payment mechanism associated with the vehicle station, transmitting a vehicle station command signal thereby activating the vehicle station S240.

Preferably the method applies the use of computer vision wherein the method includes: storing a payment mechanism in association with an account associated with a vehicle; collecting image data of a region including at least a vehicle station; detecting presence of an identifying signal associated with the account in proximity to the vehicle station by identifying a vehicle through CV processing of collected image data; upon detecting the identifying signal, selecting the payment mechanism associated with the account; and, in response to collecting the payment mechanism associated with the vehicle station, transmitting a vehicle station command signal thereby activating the vehicle station.

The method for applying a detected identifying signal can be used in the context of automated commerce where a payment mechanism is detected outside of the vehicle station and applied to the use of the vehicle station and automated commerce. Alternatively, the method could be used for any suitable transaction such as when use of the vehicle station (possibly without any secondary automated commerce) can be paid through an electronic transaction using the collected payment mechanism. As a user experience for this method variation, the user can drive up to a gas station and when the user approaches the gas pump, the method has already transparently collected the payment mechanism and enabled the gas pump for use.

Block S120, which includes collecting image data, functions to collect video, pictures, or other imagery of the relevant environment. The image is preferably captured over a region expected to contain objects of interest (e.g., inventory items) and interactions with such objects. Preferably, collecting image data collects image data across an environment that at least partially includes a defined region containing the vehicle station and a defined commerce region (i.e., retail region). The image data will generally include image data of a region containing multiple vehicle stations. In other words, image data is preferably collected where vehicles interact with the vehicle stations and in regions where products or services are available for purchase through automated commerce. In some instances, this includes collecting image data from cameras positioned outside to view vehicles and collecting image data from cameras inside of a retail store environment. However, in some instances, at least part of the commerce region and the vehicle stations may be viewable in a shared field of view of one or more cameras wherein an imaging device is able to provide image data relevant to both regions of interest. For example, products could be displayed outside on a stand close to the vehicle stations for increased convenience to the users that wish to buy those items.

Preferably continuous camera coverage is provided so that substantially the collected image data covers a region that unifies the vehicle station(s) and the commerce region. In this way, CV people tracking can be used to track users from vehicle stations and vehicles to the commerce region and back. Alternatively, the image data may not be continuous. CV monitoring or other techniques may be used to associated people tracked near vehicle stations and when in the commerce region.

In some variations, the imaging devices used to collect image data of the vehicle stations may be oriented different from those collecting image data in the commerce region. Collecting image data of the vehicle stations can include capturing image data with redundant fields of views for people tracking between vehicles, vehicle stations, and into a commerce region. In the case where CV detection of an identifying signal is used, the collection of image data may be customized for targeted monitoring of identifying signals. An image capture device may be positioned and mounted in the vehicle service site so as to collect vehicle identifying information like license plate information. For example, collecting image data may include collecting image targeted at expected front and rear license plates of vehicles in proximity to a vehicle station.

Image data is preferably collected from across the environment from a set of multiple imaging devices. Preferably, collecting imaging data occurs from a variety of capture points. The set of capture points include overlapping and/or non-overlapping views of monitored regions in an environment. Alternatively, the method may utilize a single imaging device, where the imaging device has sufficient view of the exercise station(s). The imaging data preferably substantially covers a continuous region. However, the method can accommodate for holes, gaps, or uninspected regions. In particular, the method may be robust for handling areas with an absence of image-based surveillance such as bathrooms, hallways, and the like.

The imaging data may be directly collected, and may be communicated to an appropriate processing system. The method may include controlling and directly collecting image data from imaging devices. Alternatively, collecting data may include collecting image data from existing surveillance or video systems wherein existing surveillance systems may be used as a data source. The imaging data may be of a single format, but the imaging data may alternatively include a set of different imaging data formats. The imaging data can include high resolution video, low resolution video, photographs from distinct points in time, imaging data from a fixed point of view, imaging data from an actuating camera, visual spectrum imaging data, infrared imaging data, 3D depth sensing imaging data, parallax, lidar, radar, sonar, passive illumination, active illumination, and/or any suitable type of imaging data.

The method may be used with a variety of imaging systems, collecting imaging data may additionally include collecting imaging data from a set of imaging devices set in at least one of a set of configurations. The imaging device configurations can include: aerial capture configuration, shelf-directed capture configuration for commerce regions, movable configuration, and/or other types of imaging device configurations. Imaging devices mounted over-head are preferably in an aerial capture configuration and are preferably used as a main image data source. In some variations, particular sections of the environment may have one or more dedicated imaging devices directed at a particular region or product so as to deliver content specifically for interactions in that region. In some variations, imaging devices may include worn imaging devices such as a smart eyewear imaging device. This alternative movable configuration can be similarly used to extract information of the individual wearing the imaging device or other observed in the collected image data.

Block S130, which includes initializing monitoring of at least one detected user associated with the vehicle station, functions to detect what user(s) to associate with the payment mechanism when facilitating electronic transactions. An imaging system preferably collects image data that is used to detect the user. Initialization of monitoring of a user may be automatic wherein every user that visits the vehicle service site and provides a payment mechanism may be automatically enabled to utilize the automatic checkout process. Alternatively, a user may need to explicitly opt into using the system. For example, an option may be presented on a screen of the vehicle service station (e.g., the gas pump) that if selected during a user's visit will enable commerce automation. The commerce automation may additionally be restricted to particular types of users.

Initializing monitoring of a user may be used to track monitoring of that user to the commerce region. For example, some form of CV-based person tracking can be applied using the imaging systems in the vehicle station region to the commerce region. In another variation, initializing monitoring of a user can establish some signature or identification mechanism such that a user in the vehicle region can later be associated with a user in the commerce region. This may be an approach for non-continuous image monitoring of users between commerce region and the vehicle locations.

The method may include performing CV person detection on the collected image data as a periodic or background processing routine to detect when to initialize monitoring. CV person detection may be triggered or initialized based on lower complexity monitoring.

In one variation, image changes in sub-regions of the image data defined within a proximity space near the vehicle station(s) can trigger analyzing relevant image data of the vehicle station for person presence. The location and the size may be predefined through manual configuration. Alternatively, the location and size for detecting image changes that result in CV person detection may be learned or updated using machine learning, deep learning or any suitable algorithmic modeling of where to monitor for human presence.

In another variation, an external sensor may trigger CV person detection. For example, a motion sensor or proximity sensor may be used to detect nearby activity near a vehicle station, which may initiate CV processing of relevant image data. In one particular example, user interface input received at the vehicle station may initiate detection and monitoring of a user. The user interface input may be input indicating confirmation by the user to enable automated checkout. Accordingly, the method may include in this variation: providing a user interface at the vehicle station presenting an option for camera-based commerce automation and receiving user selection of an option for automated commerce; wherein initializing monitoring is triggered at least partially based on received user selection of the option for automated commerce.

Block S130 preferably facilitates establishing an association of one or more users with a vehicle station and/or a vehicle. Establishing the association may include detecting the user triggering the monitoring as described above. Alternatively, user position tracking can be used to determine a likely primary user of a vehicle station and/or a vehicle. In one variation, monitoring of users is performed automatically for all users detected in the environment and block S130 includes predicting an association of a user and vehicle station based on detection of user-station interactions and/or proximity of the user and/or vehicle to the vehicle station at some point.

In one variation, the user in nearest proximity to the vehicle service station at the time the payment mechanism detected is selected as the user to be associated with the payment mechanism. In another variation, an imaging system monitors and identifies the user exiting the driver seat of the vehicle and this user is linked to the payment mechanism. In some case, determination of user association to a vehicle may be achieved through performing reverse person tracking through the image data and determining from which car a user originated. Vehicle origination is preferably determined for variations where vehicle identification at least partially determines the payment mechanism. As discussed below, some variations may include initializing monitoring for a plurality of users associated with a vehicle.

Block S140, which includes monitoring commerce activity by processing the image data, functions to detect and track events or actions related to the user that are recorded for eventual payment using the payment mechanism. Monitoring commerce activity is preferably used in detecting and tracking a checkout list of a user. More specifically, monitoring commerce activity includes monitoring a checkout list of a user through a CV monitoring system. Monitoring a checkout list will generally include, through CV processing of image data, detecting one or more commerce activity event involving a user and updating a checkout list associated with the user in accordance with and based on the commerce activity event. Commerce activity preferably involves the selection of products by a user for purchase. Selection may include picking up items and carrying the items, placing the items in a basket or cart, consuming an item, and/or other variations that qualify as signal a user's intent to pay for the item. Commerce activity may additionally or alternatively include usage-based commerce. Accordingly monitoring commerce activity may involve measuring amount of use for one or more item and/or service. Usage-based commerce may include using of a machine such as a drink dispenser, using a space such as a sitting/media room, and/or performing any suitable action that is configured for tracking and billing.

Monitoring commerce activity by processing image preferably involves detecting item and customer interactions based on the image data and modeling/tracking those interactions as they relate to the commerce activity. A variety of techniques may be used. Detecting commerce activity can include processes related to classifying objects from the image data, tracking object locations in the environment, and detecting interaction events.

With respect to a single user, detecting commerce activity can include tracking location of a user in a commerce region and detecting and classifying an event in the image data as commerce activity and updating transactions of the checkout list of the user according to the commerce activity.

Applying CV-based processing (i.e., processing image data with CV processes/modeling) across multiple users in the environment can include tracking a set of users through the commerce regions of the environment; for each user, detecting item interaction events; and updating items in a checkout list of an associated user based on the item interaction event (e.g., adding or removing items). A CV monitoring system used in monitoring commerce activity may use algorithmic approaches applying traditional computer vision techniques, deep learning models, machine learning, heuristic modeling, and/or other suitable techniques in processing the image data. The CV monitoring system may additionally use human in-the-loop-input in evaluating image data in part or whole, which can include transmitting at least a portion of image data to a data labeling user interface and receiving interaction labels of the image data. The interaction labels may include classifying objects, tracking object/person locations, and/or labeling interaction events so as to assist in updating the checkout list of a user.

The checkout list model is preferably generated at least in party with CV monitoring but a variety of types of automatic checkout systems may additionally or alternatively facilitate monitoring of the commerce activity which could include a wireless item tagging system, a smart shelving system, a smart cart system, a sensor fusion system, user application (e.g., a scanning system for customer assisted entry in the shopping region), human-in-the-loop processing, and/or approach or combination of approaches for generating a record of items to purchase while shopping and executed at a checkout region. In a CV monitoring system variation, generating a checkout list can include applying computer vision modeling of item and customer interactions based on the image data, and in response to detecting customer-item interactions, updating a checkout list. With a smart shelving system, a scale or other shelving-based sensors may detect changes in inventory state which can be used to credit item removal events to customer selection of an item.

In the general retail case, a CV monitoring system and/or another suitable sensor monitoring system preferably comprises machine-readable instructions configured for detecting item selection events (e.g., picking an item for purchase and/or unselecting an item for purchase), identifying the items, and associating the item selection events with a user. This process can be performed repeatedly over the duration of a shopping session such that a detected checkout list reflects the real-world items selected by a user. The items in the checkout list will preferably have an associated price that can be used to calculate a price total for the checkout list price. The monitoring of a checkout list can be performed in a variety of ways and preferably can utilize the system and method discussed in US Patent Application publication No. 2017/0323376, or any suitable alternative, which hereby incorporated in its entirety by this reference.

Figure 8:
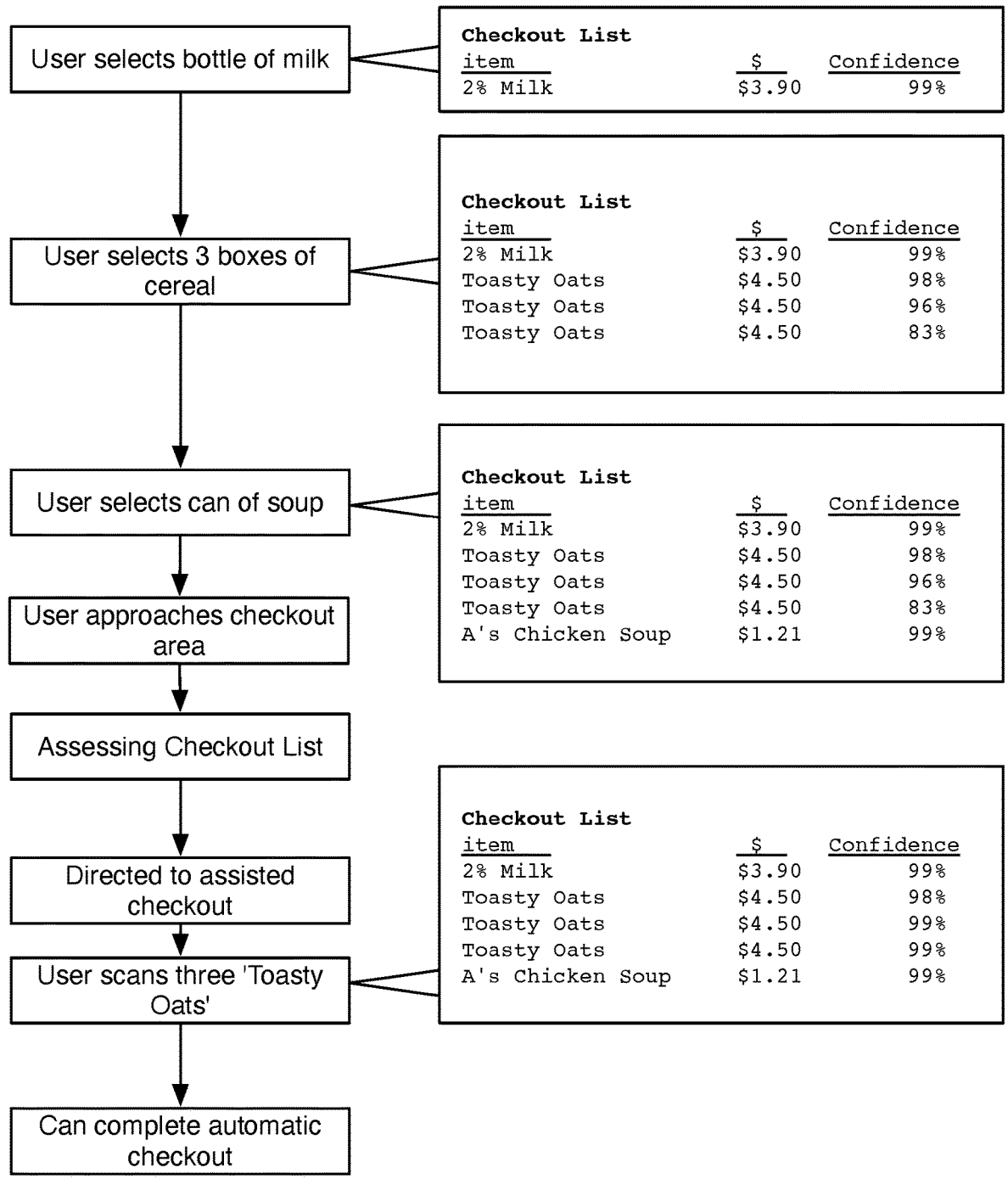
FIG. 8 is a schematic representation of one exemplary variation for modeling of a checkout list.

The checkout list can be a "virtual cart" in that it represents items or services intended for purchase. The checkout list can be a predictive model of the items selected by a customer and/or invoiced usage of items/services by a customer. In addition to the identity of the items, the checkout list may include a confidence level for the checkout list and/or individual invoiced items. The checkout list is preferably a data model of predicted or sensed interactions that can be applied to providing indication of predicted bill. Other variations of the method may have the checkout list be tracking of the number of items possessed by a customer, detection of only particular item types (e.g., controlled goods like alcohol, or automatic-checkout eligible goods), and/or records of tracked item/service usage. As shown in FIG. 8, a checkout list is preferably generated during the shopping experience such that a prediction or expectations for the items selected by a customer is modeled when a customer enters a checkout region.

Various forms of item exceptions may be handled in a variety of suitable approaches. User-filled fountain drinks, alcoholic beverages, and/or other non-standard items may have specialized handling processes. In some implementations, they may trigger a different interaction flow. For example, selection of an alcoholic beverage will generally result in the user needing to show proper ID to a worker. Alternative, forms of commerce fueled by CV-based monitoring and/or other forms of sensor monitoring may similarly be used.

Figure 9:
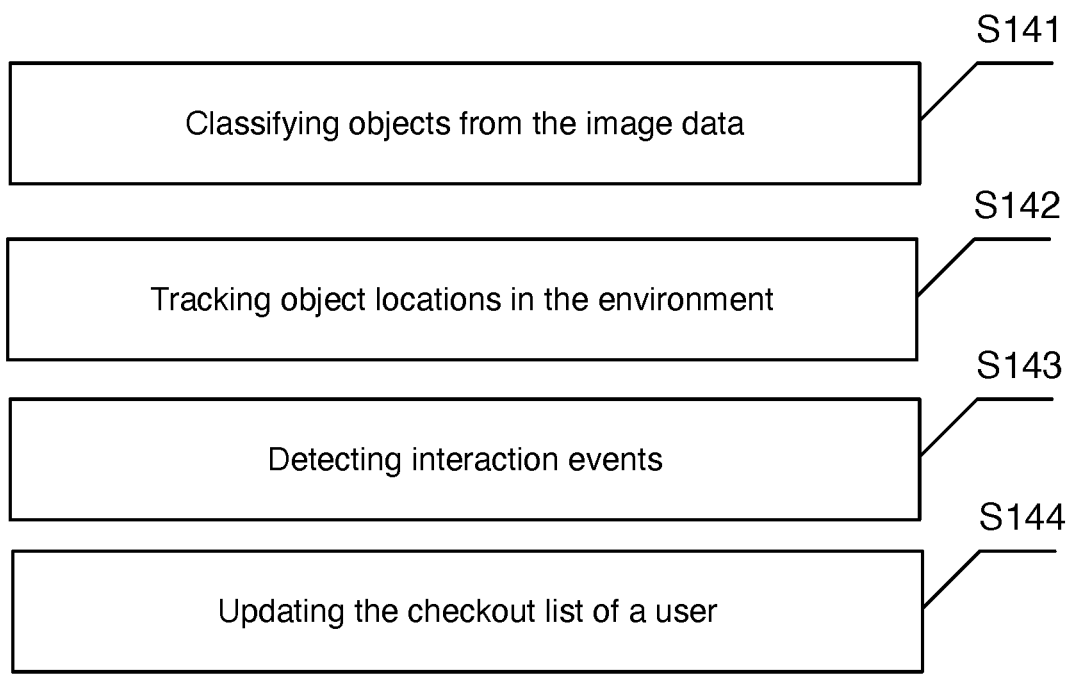
FIG. 9 is a flowchart representation of process variations for monitoring commerce activity using computer vision.

A variation of monitoring commerce activity through processing of the image data can include classifying objects from the image data S141, tracking object locations in the environment S142, detecting interaction events S143, and/or updating the checkout list of a user S144 as shown in FIG. 9. These processes may be used in other areas of CV processing in the method. With respect to monitoring a checkout list, CV processing an include: classifying product items from the image data from the commerce region; tracking user location in the environment; detecting user-item interaction events; and/or updating the checkout list according to object classifications, user location, and the detected interaction events. Monitoring commerce activity preferably includes iteratively processing the image data and applying various image data analysis processes.

Figure 10:
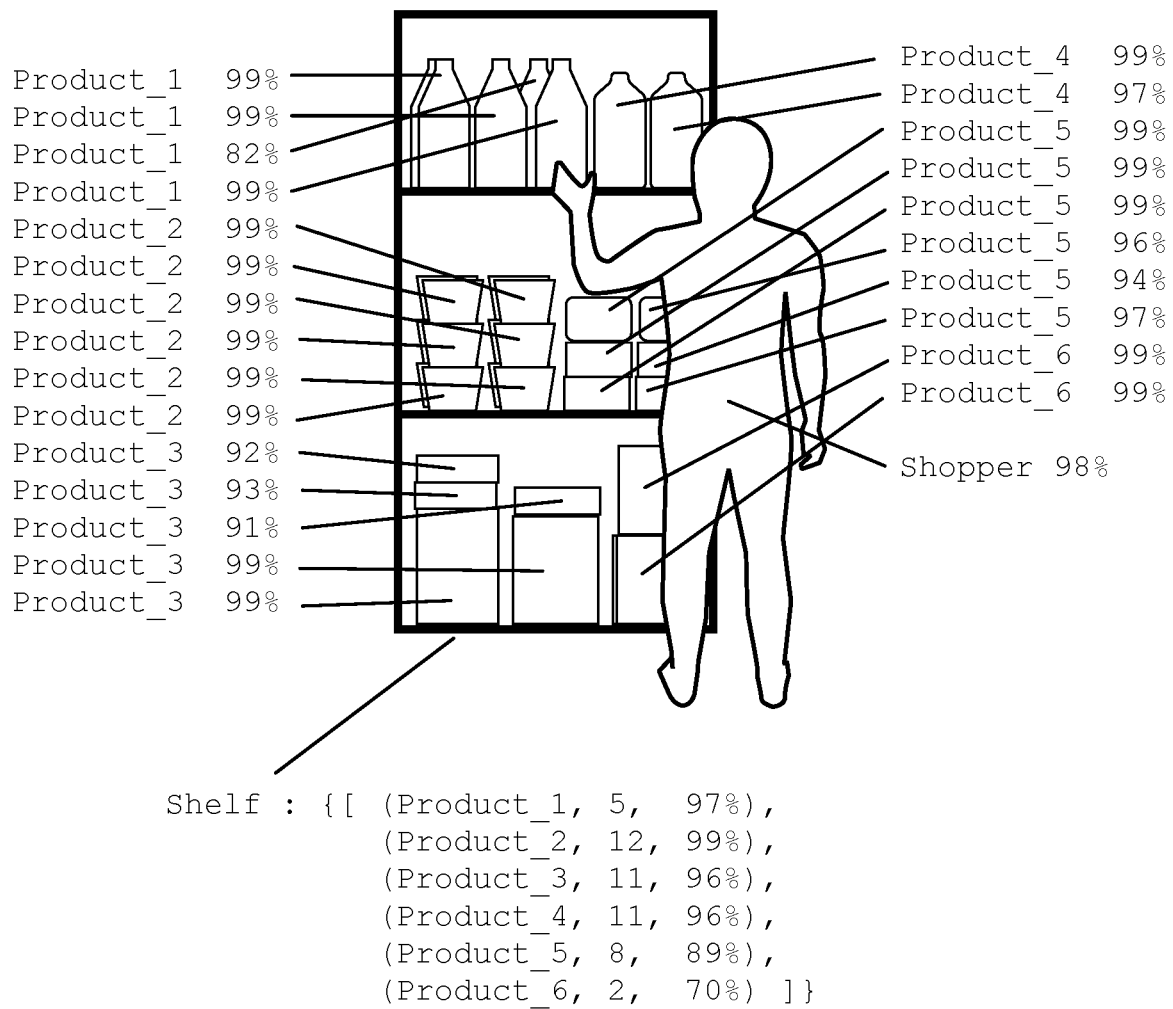
FIG. 10 is a schematic representation of a classifying objects in image data of a commerce region.

Block S141, which includes classifying objects from the image data, functions to perform object detection. Objects are detected and classified using computer vision or other forms of programmatic heuristics, artificial intelligence, machine learning, statistical modeling, and/or other suitable approaches. Object classification can include image segmentation and object identification as part of object classification. Resulting output of classifying objects of image data of a single image or video stream can be a label or probabilistic distribution of potential labels of objects, and a region/location property of that object. Classifying objects in a single image of the image data can yield multiple object classifications in various regions. For example, an image of a shelf of products with a shopper present can yield classifications for each visible product, the shelf, and the shopper as shown in FIG. 10.

Various techniques may be employed in object classification such as a "bag of features" approach, convolutional neural networks (CNN), statistical machine learning, or other suitable approaches. Neural networks or CNNS such as Fast regional-CNN (r-CNN), Faster R-CNN, Mask R-CNN, and/or other neural network variations and implementations can be executed as computer vision driven object classification processes.

Image feature extraction and classification is an additional or alternative approach, which may use processes like visual words, constellation of feature classification, and bag-of-words classification processes. These and other classification techniques can include use of scale-invariant feature transform (SIFT), speeded up robust features (SURF), various feature extraction techniques, cascade classifiers, Naive-Bayes, support vector machines, and/or other suitable techniques.

Additionally, multiple variations of algorithmic approaches can be implemented in accounting for particular classes of object classification. A hierarchical classification process can be used in iteratively refining classification and/or bounding the classification challenge for enhancing classification confidence and/or speed. In one variation, classifying objects can be limited or isolated to updating based on changes in image data. In one variation, classifying objects of image can be limited to subregions of the image data satisfying a change condition. For example, an image of a shelf of products with a shopper in the lower right quadrant of the image may only have object classification executed for a region within that lower right quadrant, which can alleviate the method from reclassifying products that are static in the image data.

In some variations, object classification can be actively confirmed or informed through another data input channel. For example, a calibration tool may be used for logging an object with a confirmed classification (e.g., a SKU identifier), location, and time.

Classifying objects preferably includes identifying a product identifier for visible products. The product identifier may be SKU or data record of a product, which may include various pricing information that can be used in adding the item as an invoiced item if selected.

Block S142, which includes tracking objects in the environment, functions to monitor the location of an object in establishing an object path. Tracking an object can include tracking the object within image data from a single image capture device but more preferably tracks the object across image data from multiple image capture devices. Tracking an object can additionally be used in identifying and associating objects across image capture devices.

Tracking objects in the environment can, in some variations, include tracking people (i.e., users) in the environment. Tracking users functions to maintain association of a user with collected payment mechanism and/or vehicle station. Tracking objects in the environment may additionally be used in tracking items as they move through the store and their association with a user, which can signal an intention to purchase, thereby resulting in the items being added to a checkout list.

Tracking an object can include applying CV-based object tracking techniques like optical flow, algorithmic target locking and target re-acquisition, data-driven inferences, heuristical processes, and/or other suitable object tracking approaches. In the case of person tracking a variety of person tracking techniques may be used. CV-based object tracking and algorithmic locking preferably operate on the image data to determine translation of an object. Data-driven inferences may associate objects with matching or similar data features when in near temporal and spatial proximity. "Near" temporal and spatial proximity can be characterized as being identified in a similar location around the same time such as two objects identified within one to five feet and one second. The temporal and spatial proximity condition could depend on various factors and may be adjusted for different environments and/or items. Objects in near temporal and spatial proximity can be objects observed in image data from a neighboring instance of image data (e.g., a previous video frame or previously capture image still) or from a window of neighboring instances. In one variation, a window of neighboring instances can be characterized by sample count such as the last N media instances (e.g., last 10 video or still frames). In another variation, a window of neighboring instances can be characterized by a time window such as media instances in the last second.

Block S143, which includes detecting interaction events, functions to identify and characterize the nature of changes with at least one object. Interaction events can be detectable changes observed in the image data. Preferably, interaction events can be used in applying compound object modeling and multi-state modeling. An interaction event can additionally include triggering updating the checkout list.

Detecting an interaction event preferably includes detecting a user-item interaction which can be CV-based detection and/or classification of an event observed in the image data involving interactions of a user with a monitored object. Monitored objects preferably include products for purchase and/or items for use.

Detecting user-item interactions may include: detecting a user selecting of a product and thereby adding the associated item to the checkout list and optionally detecting a user deselecting of (e.g., setting down) a product and thereby removing the associated item from the checkout list. Detecting user-item interactions for usage-based interactions may include detecting use or consumption of an item. Detecting usage may include actions such as detecting dispensing of a drink from a drink machine or making use of amenities such as a waiting room or watching media. Detecting usage-based interactions can result in adding a usage record to a checkout list, which may add a fixed price transaction item but may alternatively calculate a price based on metered use.

Block S144, which includes updating the checkout list of the user, functions to manage the checkout list. The checkout list is preferably updated in response to detection of user-item interactions events as discussed above. Updating a checkout list can include adding a transaction item for a selected product, removing a transaction item for a deselected product, and/or adding a transaction item for used service or device (which may include calculating transaction item cost using measured use and usage price rate). Updating the checkout list may additionally include calculating a total price, which is used in an executed checkout transaction. Calculating a total price may include calculating effective price incorporating coupons, promotions, discounts, taxes, fee, and/or any suitable price adjustments.

Figure 11:
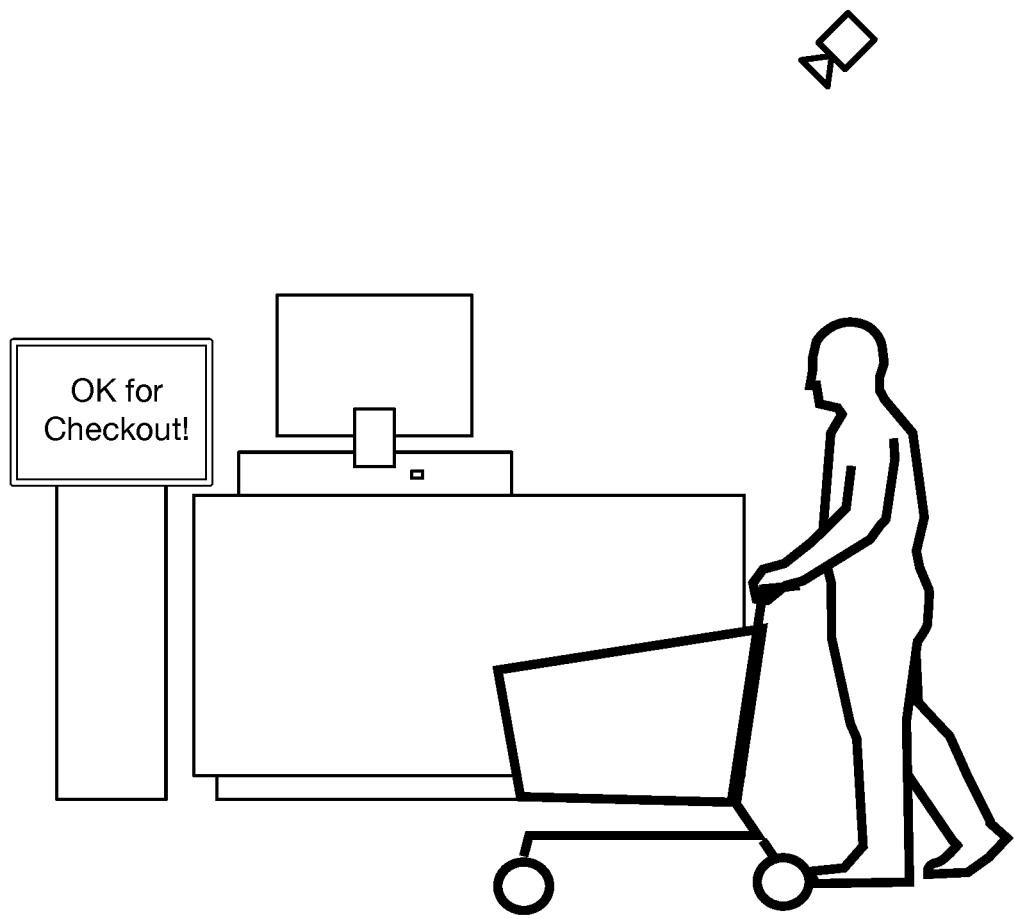
FIG. 11 is a schematic representation of a variation providing checkout process feedback.

Prior to or in connection with executing a transaction, the method may include triggering checkout process feedback. The checkout process feedback can be for the user, a worker, or any suitable entity. This is preferably user-location aware signaling that updates a signal device so that appropriate feedback can be presented as shown in FIG. 11. For example, a signal could be triggered as a user approaches an exit to signal if the user is approved for automatic checkout processing or if some issue requires handling by a worker. This can be used to appropriately direct customers. This may additionally or alternatively be used in informing working staff which customers have paid. The signaling device may be a light, an audio alert system, display, or any suitable device. In one alternative variation, a worker management system may display at least a subset of users in the environment and their respective approval state for automated checkout. A signal device may be positioned near an exit of a commerce region so that workers and the users have some clarity on who is approved for checkout and when. Preferably, all users in the environment or at least the users in a designated region (e.g., in the commerce region or within 10 feet of an entrance/exit) can be monitored. Permitted and/or prohibited signals may be activated depending on how the method wishes to communicate to involved users of the vehicle service site.

The method can include, at the interaction management system, tracking location of the user using computer vision processing of the image data (e.g., as described above) and when the user is in proximity to a signal device, activating the signal device. The signal device may be activated/transitioned to an approved state to show approval for automated commerce and completion of the transaction such as when a payment mechanism is collected for the user and there is no issue with the checkout list. The signal device may alternatively be activated/transitioned to a restricted state to show an error or warning preventing automated commerce for the user such as if a payment mechanism is not collected for the user or an issue is detected with the checkout list.

Triggering checkout process feedback preferably involves verifying approval state of a user for automated commerce. Verifying approval state can include verifying the user has a valid payment mechanism collected and/or that the checkout list is free of issues or exceptions. Other suitable conditions may additionally be applied for assessing approval state. Approval state may include a permitted state and a prohibited state. In an instance of approved automated commerce, triggering checkout process feedback may include activating a permitted/approval signal if a user has a valid payment mechanism and there are no issues with the current checkout list of the user. In an instance of prohibited automated commerce, triggering checkout process feedback may include activating a prohibited/disapproval signal if a user does not have a valid payment mechanism collected and/or a checkout list generated from CV processing has a problem.

Block S150, which includes executing a transaction with the payment mechanism for a completed checkout list, functions to finalize a purchase using the payment mechanism collected and associated with a user through the vehicle station (i.e., through the user's association with the vehicle station). Executing the transaction preferably results in generating an itemized record of the items to be purchased and initiating charging of the payment mechanism for that itemized record. This may occur when the user leaves the commerce region. In other implementations, a transaction may be executed when the vehicle leaves the vehicle service site, or at any suitable time such as after exiting the commerce region. In the case of multiple users linked to a single payment mechanism, the checkout lists of all the users can be combined into one itemized record such that the payment mechanism can be used to purchase all the items.

Execution of a transaction may be performed in coordination with triggering of checkout feedback. For example, a checkout status signal device may need to be activated and the checkout process approved prior to executing the transaction.

In one variation, automated commerce may involve an explicit checkout process where the checkout list is used to at least partially populate worker or user managed point of sale (POS) checkout kiosk or interface. In one variation, the vehicle station may display the checkout list to a user, who can then confirm the purchase through user input options of the vehicle station (e.g., buttons or a touch screen). Accordingly executing the transaction with the payment mechanism can include transmitting the checkout list to a checkout terminal, receiving confirmation. The variation could additionally include displaying the checkout list; editing the checkout list by adding items, removing items, or modifying items (e.g., changing number or selecting a product option); displaying indication of selected payment mechanism; and/or presenting other interaction variations.

Figure 12:
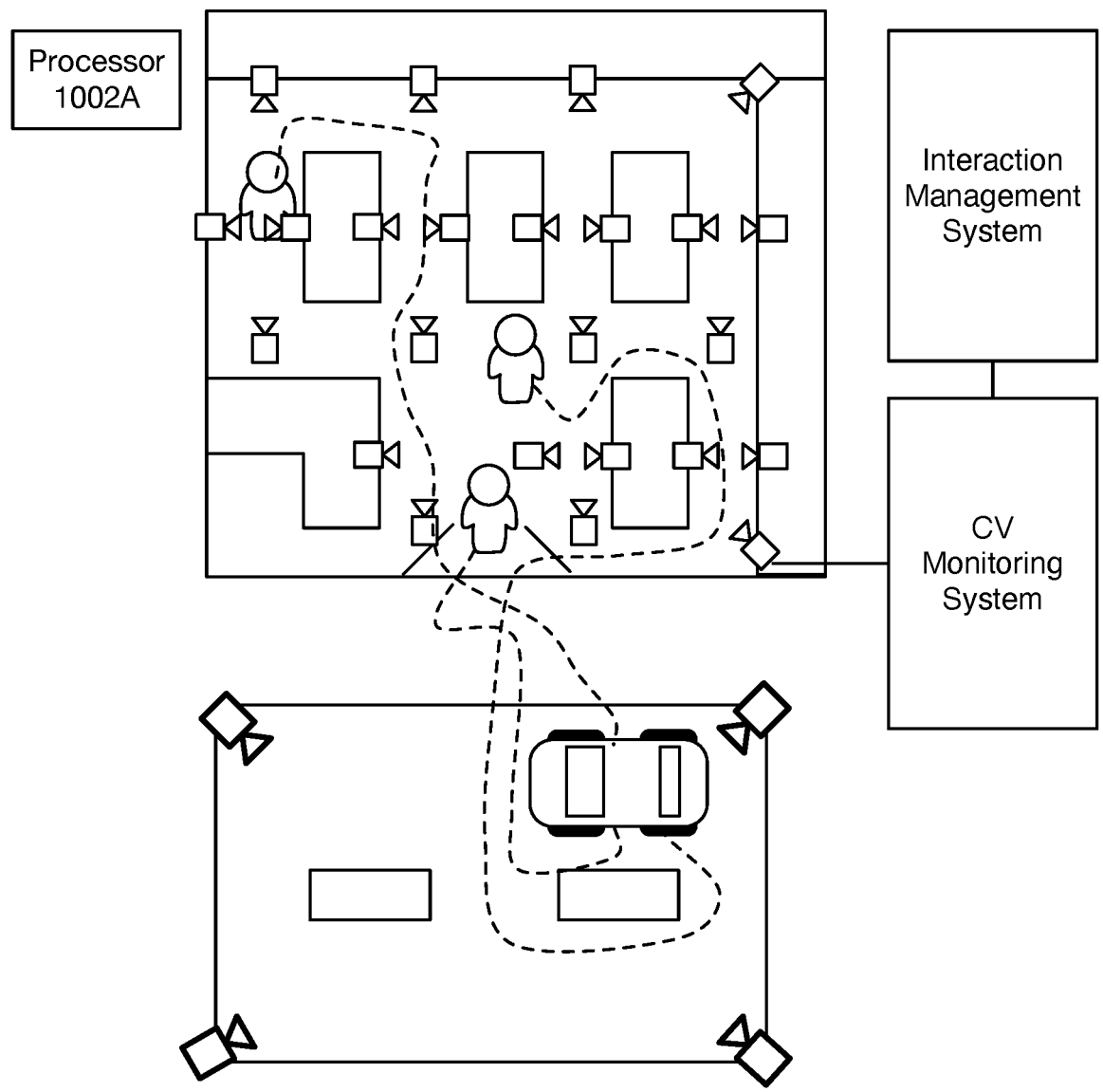
FIG. 12 is a schematic representation of monitoring commerce activity of multiple users originating from a vehicle.

As discussed above, in some variations, multiple users can be associated with a payment mechanism. Initializing multiple users preferably includes detecting a set of users exiting a vehicle and monitoring commerce activity of the set of users as shown in FIG. 12. Monitoring commerce activity of the set of users can include monitoring and generating individual checkout lists for each user. With individual checkout lists, each transaction item of a checkout list can be credited to a particular user. This may involve having a single checkout list or maintaining individual checkout lists that can be optionally combined. Alternatively, commerce activity of the set of users may be monitored as a checkout list without explicit tracking of individual users contributions.

In a multiple user variation, executing a transaction with the payment mechanism can include executing one or more transactions with the payment mechanisms for one or more checkout lists generated from monitoring commerce activity of the set of users.

This may additionally include, for each user, detecting additional properties such as seat position (e.g., backseat, front seat, driver seat, etc.), user traits (e.g., age, identity). Various rules may be pre-configured to alter how automated commerce is handled based on these properties. In multiple-user variation, the method may include configuring usage policy by vehicle passenger and enforcing usage policy during monitoring of commerce activity of the set of users.

Figure 13:
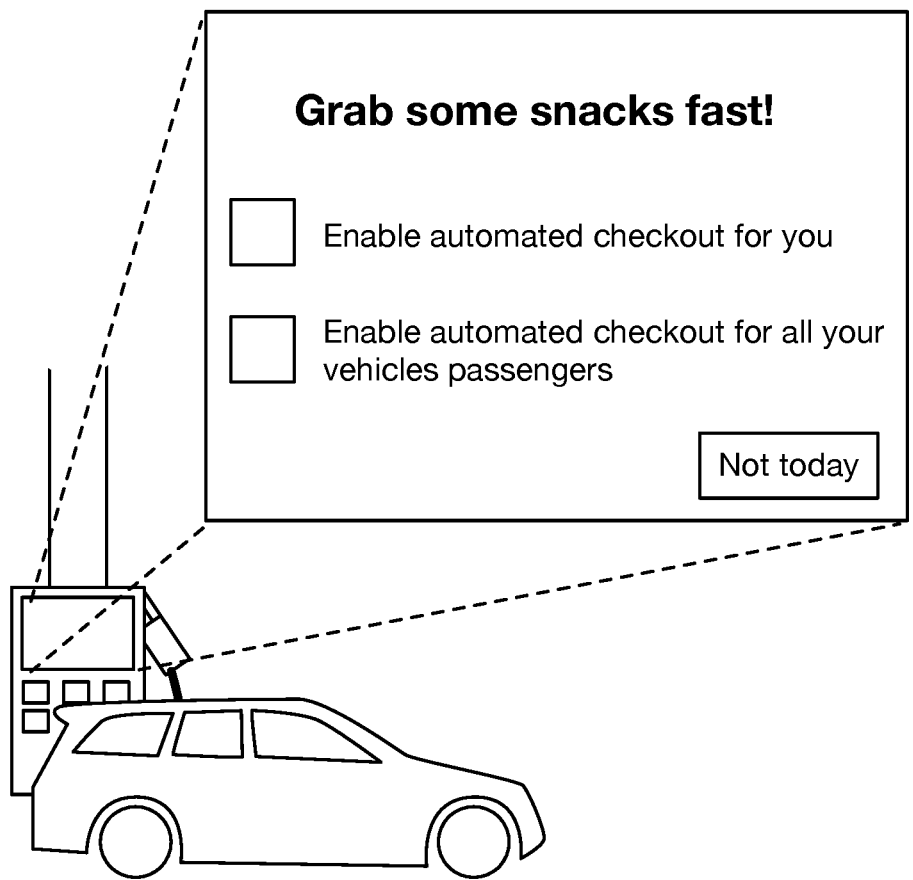
FIGS. 13 and 14 are schematic representations setting usage policy for a set users associated with a vehicle.
Figure 14:
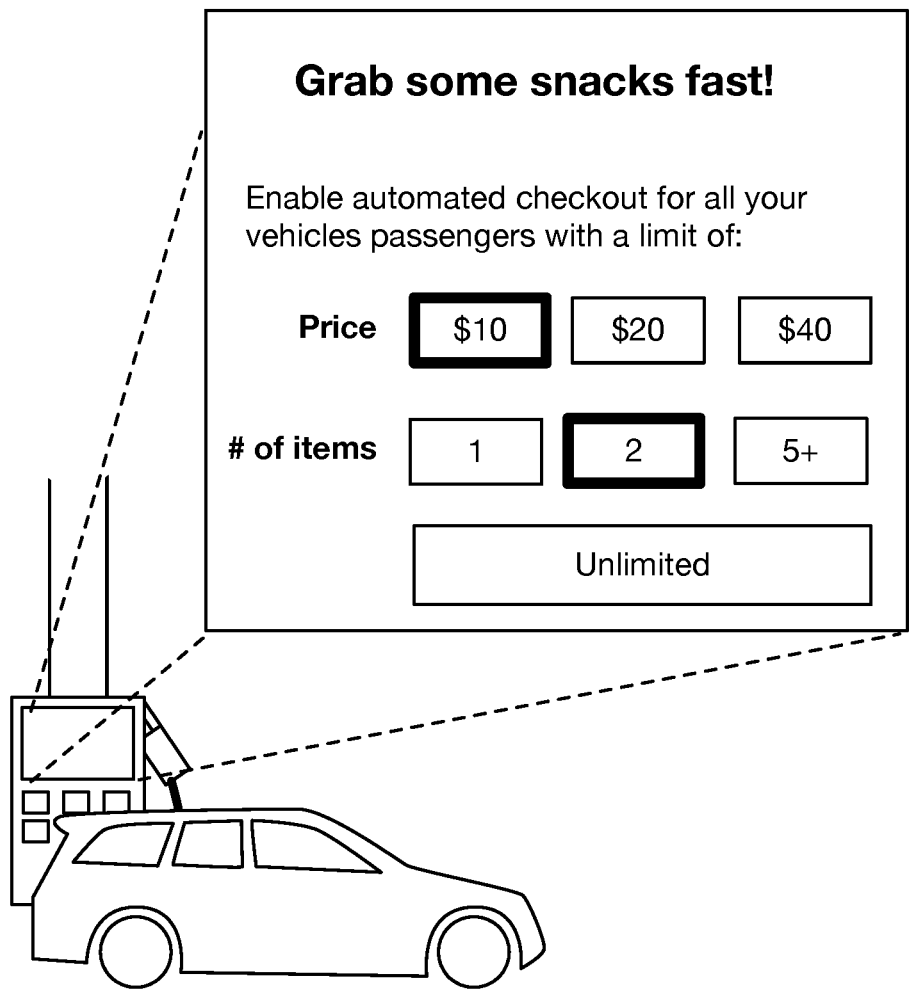

Usage policy may be configured in a variety of ways. The usage policy can be set in association with an account wherein the usage policy is automatically applied during each visit. The usage policy may alternatively be set or configured for an individual visit. In one variation, configuring usage policy can include displaying passenger usage policy at the fueling station and receiving user selection of usage policy thereby configuring the usage policy. For example, a driver of a vehicle (or another suitable user of a vehicle station) may select usage policy from a user interface of the vehicle station as shown in FIGS. 13 and 14. In one exemplary scenario facilitated through the method, when providing the payment mechanism at the pump there may be two options displayed through a user interface of a vehicle station 140: "Enable automatic checkout for you" and "Enable automatic checkout for all vehicle passengers". Received user selection of one of these options can enable automated commerce for a set of users associated with the vehicle. In another variation of the user interface, a set of potential users detected as possibly having an association with the vehicle may be displayed in a user interface (e.g., showing a graphic or image of the users and/or vehicle), and user can be permitted to select the appropriate users. In another variation, group commerce automation may be enabled through detection of a visually detectable gesture, where a primary user (e.g., the user supplying the payment mechanism) anoints selected users with the capability to use their payment mechanism. For example, after supplying a payment mechanism, the user may tap each user that has permission to purchase items.

Enforcing usage policy may include limiting a checkout list of a user. Limiting a checkout list may restrict the items purchased or the forms of automated commerce. Limiting a checkout list may additionally or alternatively set a price limit wherein the checkout list price total cannot exceed the price limit. The method may additionally include detecting violation of a usage policy and taking an appropriate action. In one variation, during violation of a policy, the method may include initiating transmission of a notification. The notification may go to a computing device of a user or be delivered to another user interface of a vehicle service site such as a vehicle station. For example, a checkout status signal device and/or a user interface of a vehicle station could be updated indicating that one or more users tracked in association with a vehicle station have a usage violation. Execution of a transaction can preferably be performed when there is no usage violation, and the usage policy is in compliance.

In one variation, usage policy can be configured and enforced for individual users or user types. Users could be individually identified (identified and tracked per visit or identified using some other identification process). User may alternatively be classified. User classification may include classifying by vehicle position, which may include classifying by seat position when arriving at the vehicle station and/or classifying by the door through which the user exited. User may also be classified by age. For example, a parent may set usage policy that restricts the amount and type of products that children riding in the car may select for purchase.

4. System Architecture

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

In one variation, a system comprising of one or more computer-readable mediums storing instructions that, when executed by the one or more computer processors, cause a computing platform to perform operations comprising those of the system or method described herein such as: registering a payment mechanism associated with a vehicle station; collecting image data; initializing monitoring of at least one detected user associated with the vehicle station; monitoring commerce activity through a computer vision monitoring system processing the image data; and at least partially in response to commerce activity, executing a transaction with the payment mechanism.

Similarly, in another variation, a non-transitory computer-readable medium storing instructions that, when executed by one or more computer processors of a communication platform, cause the communication platform to perform operations of the system or method described herein such as: registering a payment mechanism associated with a vehicle station; collecting image data; initializing monitoring of at least one detected user associated with the vehicle station; monitoring commerce activity through a computer vision monitoring system processing the image data; and at least partially in response to commerce activity, executing a transaction with the payment mechanism.

Figure 15:
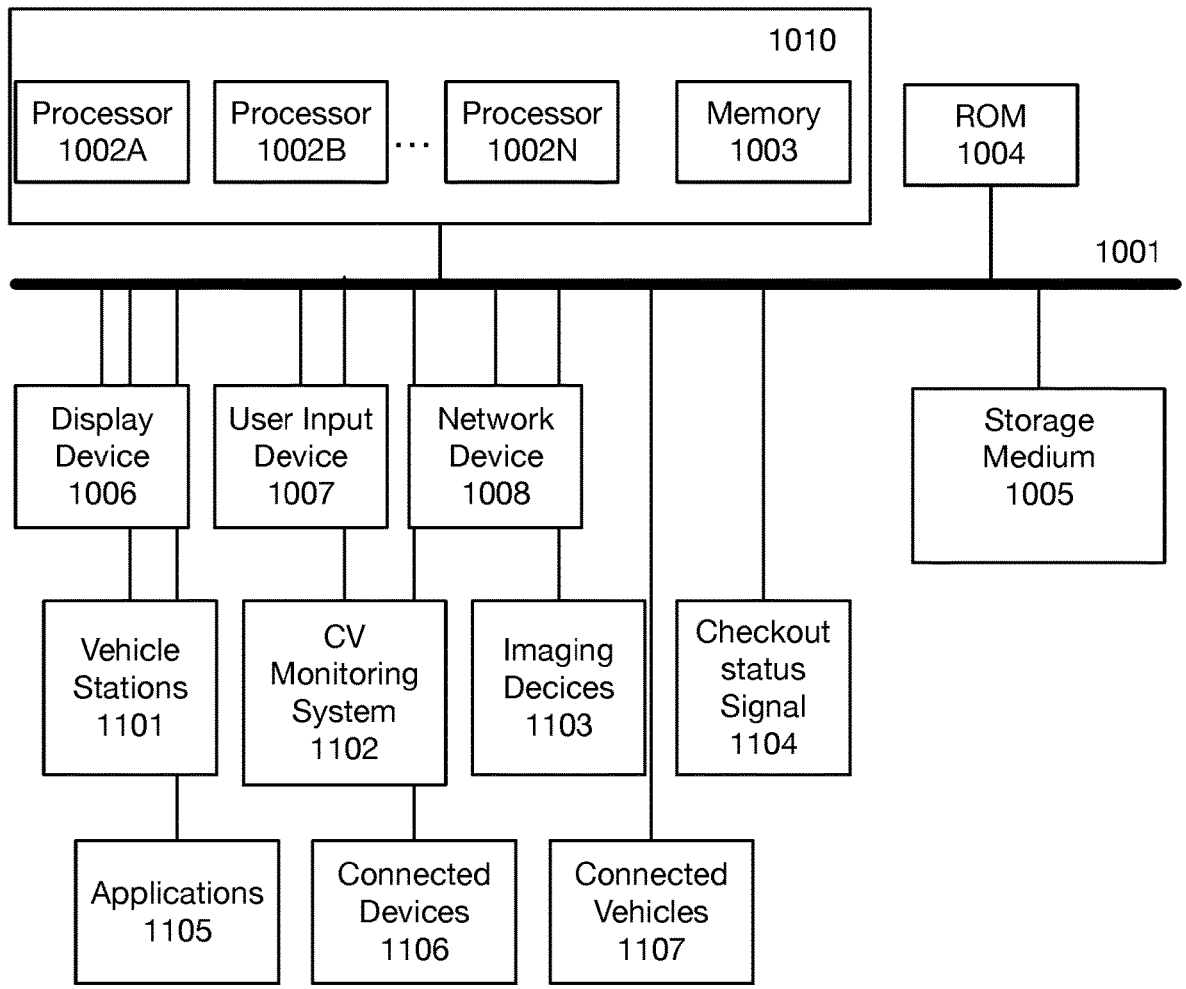
FIG. 15 is an exemplary system architecture that may be used in implementing the system and/or method.

FIG. 15 is an exemplary computer architecture diagram of one implementation of the system. In some implementations, the system is implemented in a plurality of devices in communication over a communication channel and/or network. In some implementations, the elements of the system are implemented in separate computing devices. In some implementations, two or more of the system elements are implemented in same devices. The system and portions of the system may be integrated into a computing device or system that can serve as or within the system.

The communication channel 1001 interfaces with the processors 1002A-1202N, the memory (e.g., a random access memory (RAM)) 1003, a read only memory (ROM) 1004, a processor-readable storage medium 1005, a display device 1006, a user input device 1007, and a network device 1008. As shown, the computer infrastructure may be used in connecting vehicle stations 1101, CV monitoring system 1102, imaging devices 1103, checkout status signal devices 1004, user applications operable on a user computing device 1105, connected computing devices of the vehicle service site 1106, connected vehicles 1107, and/or other suitable computing devices.

The processors 1002A-1002N may take many forms, such as CPUs (Central Processing Units), GPUs (Graphical Processing Units), microprocessors, ML/DL (Machine Learning/Deep Learning) processing units such as a Tensor Processing Unit, FPGA (Field Programmable Gate Arrays, custom processors, and/or any suitable type of processor.

The processors 1002A-1002N and the main memory 1003 (or some sub-combination) can form a processing unit 1010. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of the elements of the system.

A network device 1008 may provide one or more wired or wireless interfaces for exchanging data and commands between the system and/or other devices, such as devices of external systems. Such wired and wireless interfaces include, for example, a universal serial bus (USB) interface, Bluetooth interface, Wi-Fi interface, Ethernet interface, near field communication (NFC) interface, and the like.

Computer and/or Machine-readable executable instructions comprising of configuration for software programs (such as an operating system, application programs, and device drivers) can be stored in the memory 1003 from the processor-readable storage medium 1005, the ROM 1004 or any other data storage system.

When executed by one or more computer processors, the respective machine-executable instructions may be accessed by at least one of processors 1002A-1002N (of a processing unit 1010) via the communication channel 1001, and then executed by at least one of processors 1201A-1201N. Data, databases, data records or other stored forms data created or used by the software programs can also be stored in the memory 1003, and such data is accessed by at least one of processors 1002A-1002N during execution of the machine-executable instructions of the software programs.

The processor-readable storage medium 1205 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 1205 can include an operating system, software programs, device drivers, and/or other suitable sub-systems or software.

As a person skilled in the art will recognize from the previous detailed description and from the figures and claims, modifications and changes can be made to the embodiments of the invention without departing from the scope of this invention as defined in the following claims.

We claim:

1. A method for vehicle facilitated commerce comprising:
   collecting image data in a defined region containing a vehicle station at a vehicle service site and a defined commerce region;
   determining a payment mechanism;
   providing a user interface at the vehicle station; and at the user interface, presenting an option for camera-based automated commerce and receiving user selection of an option for camera-based automated commerce;
   initializing monitoring of at least one detected user associated with the vehicle station wherein initializing monitoring is triggered at least partially based on received user selection of the option for camera-based automated commerce;
   monitoring commerce activity of the user, which comprises of: through computer vision processing of image data, detecting at least one commerce activity event involving the user and updating a checkout list associated with the user based on the commerce activity event; and
   executing a transaction with the payment mechanism for the checkout list.

2. The method of claim 1, further comprising receiving payment authorization for the payment mechanism from a payment interface at the vehicle station.

3. The method of claim 1, wherein determining the payment mechanism comprises: storing the payment mechanism in association with an account, detecting presence of an identifying signal associated with the account in proximity to the vehicle station, and upon detecting the identifying signal, selecting the payment mechanism associated with the account.

4. The method of claim 3, wherein detecting presence of the identifying signal comprises of identifying a vehicle through computer vision processing of collected image data, wherein the identity of the identified vehicle is associated with the account.

5. The method of 4, wherein detecting presence of the identifying signal comprises of detecting device presence at the location of the vehicle service site.

6. The method of 4, in response to determining the payment mechanism, transmitting a vehicle station command signal activating the vehicle station.

7. The method of claim 1, further comprising detecting a set of users exiting a vehicle; monitoring commerce activity of the set of users; and executing one or more transactions with the payment mechanism for one or more checkout lists generated from monitoring commerce activity of the set of users.

8. The method of claim 7, further comprising: configuring usage policy by vehicle passenger and enforcing usage policy during monitoring of commerce activity of the set of users.

9. The method of claim 8, further comprising: displaying passenger usage policy at the vehicle station and receiving user selection of usage policy thereby configuring the usage policy.

10. The method of claim 1, further comprising triggering checkout process feedback to a signal device indicating the user's approval state for automated commerce.

11. The method of claim 10, wherein triggering checkout process feedback comprises tracking location of the user using computer vision processing of the image data and when the user is detected in proximity to the signal device activating the signal device to an approved state if a payment mechanism is collected for the user and there is no issue with the checkout list.

12. The method of claim 10, wherein triggering checkout process feedback comprises tracking location of the user using computer vision processing of the image data and when the user is detected in proximity to the signal device activating the signal device to a restricted state if a payment mechanism is not collected for the user or an issue is detected with the checkout list.

13. The method of claim 1, wherein detecting at least one commerce activity event involving the user and updating a checkout list associated with the user based on the commerce activity event comprises:
classifying product items from the image data from the commerce region with product identifiers associated with pricing information,
tracking user location in the environment,
detecting user-item interaction events, wherein detection of one user-item interaction event comprises of detecting a user selecting a product, and
updating the checkout list according to product identifiers, user location, and the detected user-item interaction events.

14. The method of claim 1, wherein detecting at least one commerce activity event involving the user and updating a checkout list associated with the user based on the commerce activity event comprises:
detecting user-item interaction events, wherein detection of one user-item interaction event comprises of detecting use of an item, and
updating the checkout list according to use of the item.

15. The method of claim 1, wherein the vehicle station is a fueling station.

16. The method of claim 1, wherein the vehicle station is an electric vehicle charging station.

17. A non-transitory computer-readable medium storing instructions that, when executed by one or more computer processors of a communication platform, cause the communication platform to:
collect image data in a defined region containing a vehicle station at a vehicle service site and a defined commerce region;
determine a payment mechanism;
at a user interface of the vehicle station, present an option for camera-based automated commerce and receive user selection of an option for camera-based automated commerce;
initialize monitoring of at least one detected user associated with the vehicle station wherein initializing monitoring is triggered at least Partially based on received user selection of the option for camera-based automated commerce;
monitor commerce activity of the user, which comprises of: through CV processing of image data, detecting at least one commerce activity event involving the user and updating a checkout list associated with the user based on the commerce activity event; and
execute a transaction with the payment mechanism for the checkout list.

18. A system comprising of:
one or more computer-readable mediums storing instructions that, when executed by the one or more computer processors, cause a computing platform to perform operations comprising:
collecting image data in a defined region containing the vehicle station and a defined commerce region,
determining a payment mechanism,
at a user interface of the vehicle station, presenting an option for camera-based automated commerce and receiving user selection of an option for camera-based automated commerce,
initializing monitoring of at least one detected user associated with the vehicle station wherein initializing monitoring is triggered at least partially based on received user selection of the option for camera-based automated commerce,
monitoring commerce activity of the user, which comprises of: through CV processing of image data, detecting at least one commerce activity event involving the user and updating a checkout list associated with the user based on the commerce activity event, and
executing a transaction with the payment mechanism for the checkout list.

* * * * *